(12) United States Patent
Hanai et al.

(10) Patent No.: US 6,967,650 B1
(45) Date of Patent: Nov. 22, 2005

(54) IMAGE GENERATING SYSTEM AND PROGRAM

(75) Inventors: Naohito Hanai, Yokohama (JP); Masahide Kawakami, Kawasaki (JP)

(73) Assignee: Namco Ltd., Tokyo (JP)

( * ) Notice: Subject to any disclaimer, the term of this patent is extended or adjusted under 35 U.S.C. 154(b) by 102 days.

(21) Appl. No.: 09/786,981

(22) PCT Filed: Jul. 21, 2000

(86) PCT No.: PCT/JP00/04884

§ 371 (c)(1),
(2), (4) Date: Apr. 12, 2001

(30) Foreign Application Priority Data

Jul. 21, 1999 (JP) ................................. 11-206768

(51) Int. Cl.[7] ............................................. G06T 15/00
(52) U.S. Cl. ...................... 345/419; 345/424; 345/441
(58) Field of Search ................................. 345/473, 424, 345/419, 441, 474, 475

(56) References Cited

U.S. PATENT DOCUMENTS

| | | | | |
|---|---|---|---|---|
| 5,261,041 A | * | 11/1993 | Susman ........................ | 345/473 |
| 6,040,840 A | | 3/2000 | Koshiba et al. ............. | 345/441 |
| 6,054,992 A | * | 4/2000 | Gibson ......................... | 345/424 |
| 6,069,634 A | | 5/2000 | Gibson ......................... | 345/424 |
| 6,456,289 B1 | * | 9/2002 | O'Brien et al. ............. | 345/473 |
| 6,512,516 B1 | * | 1/2003 | Schill et al. ................. | 345/424 |

FOREIGN PATENT DOCUMENTS

| | | | | |
|---|---|---|---|---|
| JP | 5101161 A | * | 4/1993 | ........... G06F 15/62 |
| JP | A 05-101161 | | 4/1993 | |
| JP | A 07-254075 | | 10/1995 | |
| JP | A 10-208078 | | 8/1998 | |
| JP | A 10-334278 | | 12/1998 | |
| JP | A 2000-113225 | | 4/2000 | |

OTHER PUBLICATIONS

Mazarak et al., Animating Exploding Objects, Jun. 1999, Graphics Interface, pp. 211-218.*

* cited by examiner

*Primary Examiner*—Phu K. Nguyen
(74) *Attorney, Agent, or Firm*—Oliff & Berridge, PLC

(57) ABSTRACT

Am image generating system and program which can generate an image in which the change of state in an object propagate with less amount of data and reduced load in computation is provided. The image generating system generates an aggregate object (600) which is formed by a plurality of elemental objects. Each of the elemental objects (610-1 to 610-9) has means (620-1 to 620-9) for holding its own state in its own state buffer (622-1 to 622-9), means (640-1 to 640-9) for monitoring the other elemental objects belonging to the same aggregate object, and means (650-1 to 650-9) for changing the state of that elemental object when the states of the other elemental objects having a predetermined relationship relative to the elemental object are changed.

20 Claims, 28 Drawing Sheets

IMAGE GENERATING SYSTEM AND PROGRAM

TECHNICAL FIELD

The present invention relates to an image generating system and program.

BACKGROUND ART

There is known an image generating system which can generate an image as viewed within a virtual three-dimensional or object space from a given viewpoint. Such a system is very popular since one can experience a so-called virtual reality through it. Now considering a image generating system for playing a gun game, a player (or operator) can enjoy a three-dimensional shooting game by manipulating a gun-shaped controller (or shooting device) to shoot targets such as enemy characters (or objects) and the like which are displayed on a screen.

In order to improve the virtual reality for a player in such an image generating system, it was an important technical problem to produce more real images. It is thus desired that when, for example, a glass plate is broken by impact such as hitting bullet, the broken glass may be more realistically represented.

In the conventional image generating systems, however, an image representing the glass plate broken by the bullet was simply replaced by another previously provided picture representing a broken glass plate. Consequently, the same picture is represented whenever the bullet hits any glass plate. The representation is monotonic and lacks in reality.

According to such a technique, once a glass plate is hit and broken by a first bullet, the image will not change even if the glass plate is subsequently hit by any number of bullets. The representation was insufficient, for example, when it is possible that the glass plate will continuously be hit by many bullets in high-speed continuous shooting.

In the prior art, furthermore, the glass plate will be broken into pieces instantaneously when a bullet hits the glass plate. Thus, it was difficult in the prior art to represent a situation in which the glass plate is gradually being broken.

Where a bullet hits an aggregate object 210 consisting of a plurality of stacked objects as shown in FIG. 19, there are different collapse manners depending on the position of the hit object. For example, if a bullet hits an object 242, it will only collapse. If a bullet hits an object 218, all the objects 222, 224, 226 above the hit object 218 will collapse.

In the conventional image generating systems, however, the previous picture is only replaced by another previously provided picture representing a single manner of collapse even though a bullet hits any of the stacked objects. Therefore, the same manner of collapse is always provided even though a bullet hits any of the stacked objects. This is monotonic and lacks in reality.

According to such a technique, once the aggregate object is hit and collapsed by a first bullet, the image will not change even if the glass plate is subsequently hit by any number of bullets. The representation was insufficient, for example, when it is possible that the aggregate object will continuously be hit by many bullets in high-speed continuous shooting.

DISCLOSURE OF THE INVENTION

An object of the present invention is therefore to provide an image generating system and program which can generate images representing a change of state in an object in real-time with less amount of data and reduced load in computation.

(1) The present invention provides an image generating system which generates an image of an aggregate object formed by a plurality of elemental objects, the system comprising:

means which changes a state of an elemental object among the plurality of elemental objects in accordance with occurrence of an event;

state change propagation means which propagates the state change to another elemental object which belongs to the same aggregate object as the changed elemental object; and image generation means which generates an image in accordance with a state of an elemental object.

The present invention also provides a computer-readable program embodied on an information storage medium or in a carrier wave, comprising information (or program) for implementing (or executing) the above-described means. The computer-readable program according to the present invention comprises a processing routine for implementing (or executing) the above-described means.

The occurrence of an event may include the reception of impact, the hitting of a bullet, the elapse of a predetermined time period or the implementation of a given game condition.

According to the present invention, the state change of an elemental object due to the occurrence of an event can be propagated to another elemental objects belonging to the same aggregate object. Since the image generation is carried out according to a state of an elemental object, an image representing the propagation of the state change to another elemental object can be generated.

(2) In the image generation by the image generating system or the program according to the present invention, at least one of shape, color, position, rotation angle, direction, moving direction and moving speed may be changed in accordance with the state change of an elemental object.

According to the present invention, an image representing the propagation of at least one of the shape, color, position, rotation angle, direction, moving direction and moving speed in each elemental object to the other elemental objects can be generated.

(3) In the image generating system or the program according to the present invention, the state change propagation means may comprise:

state hold means which holds a state of an elemental object;

state monitor means which monitors a state of another elemental object belonging to the same aggregate object as the state-held elemental object; and state change means which changes a state of an elemental object when a state of another elemental object which has a predetermined relationship with the elemental object has changed.

In such a manner, a state of an elemental object can be changed in accordance with the state change of another elemental object.

(4) In the image generating system or the program according to the present invention, the state change means of the state change propagation means may change a state of an elemental object when a state of another elemental object which has a predetermined positional relationship with the elemental object has changed.

The positional relationship relates to at least one of a position and a direction.

According to the present invention, the state change of another elemental object having a predetermined positional relationship with the elemental object can be propagated to the elemental object.

For example, the system or program can make the state change means change a state of an elemental object when a state of another elemental object which is positioned under the elemental object has changed. This makes it possible to generate more simply an image representing the collapse of objects due to the gravity.

(5) In the image generating system or the program according to the present invention, the state change means of the state change propagation means may determine at random whether or not a state of an elemental object is changed when a state of another elemental object which has a predetermined relationship with the elemental object and belongs to the same aggregate object as the elemental object has changed.

Thus, a random change can be implemented, and a variety of unexpected changes can be represented in images.

(6) In the image generating system or the program according to the present invention, the state change means of the state change propagation means may change the state of the elemental object after a given time has elapsed from the state change of another elemental object.

This makes it possible to generate an image that the elemental objects are changed in series.

(7) In the image generating system or the program according to the present invention, the state change means of the state change propagation means may change a first state of an elemental object into a second state after a given time has elapsed.

This makes it possible to change a state of an elemental object in accordance with any factor other than a relationship with another elemental object. For example, an image can be generated to be necessarily changed on elapse of a given time period.

If a dish falls from a rack and breaks on a floor, time counted from the fall from the rack to the breaking on the floor can be computed. In such a case, the present invention can change the first state in which the dish falls from the rack to the second state in which the dish impacts and breaks on the floor after a given time period has elapsed.

(8) In the image generating system or the program according to the present invention, the state change propagation means may be provided for each elemental object.

According to the present invention, each elemental object can be processed individually. Therefore, an object-oriented processing can be implemented and more simple processing for a complicated change is enabled.

In each elemental object, the state change propagation means may comprise:

state hold means which holds a state of an elemental object;

state monitor means which monitors a state of another elemental object belonging to the same aggregate object as the state-held elemental object; and state change means which changes a state of an elemental object when a state of another elemental object which has a predetermined relationship with the elemental object has changed.

In each elemental object, the state change means of the state change propagation means may have a means which changes a state of an elemental object when a state of another elemental object which has a predetermined positional relationship with the elemental object has changed.

In each elemental object, the state change means of the state change propagation means may have a means which determines at random whether or not a state of an elemental object is changed when a state of another elemental object which has a predetermined relationship with the elemental object and belongs to the same aggregate object as the elemental object has changed.

In each elemental object, the state change means of the state change propagation means may have a means which changes the state of the elemental object after a given time has elapsed from the state change of another elemental object.

In each elemental object, the state change means of the state change propagation means may have a means which changes a first state of an elemental object into a second state after a given time has elapsed.

(9) In the image generating system or the program according to the present invention, a plurality of state change patterns may be provided for the elemental objects, and an image of the changed elemental object may be generated in accordance with a state change pattern selected from the plurality of state change patterns.

The selection may be carried out randomly or under a given condition.

If a plurality of such patterns are provided, more complicated changes can be represented. This can provide a variety of unexpected images.

For example, if a plurality of state change patterns representing broken states are previously provided, it can be prevented for the representation from becoming monotonic, providing a variety of realistic broken images.

The selection of the state change pattern may depend on at least one of a position of an elemental object and a relative position with another elemental object.

This makes it possible to change a state of an elemental object in accordance with its position or a relative position with another elemental object.

(10) In the image generating system or the program according to the present invention, the aggregate object may be formed by assembling the elemental objects having different shapes without any gaps.

By assembling the elemental objects having different shapes without gaps into a plane, an aggregate object such as a glass plate or a wall can be represented.

By assembling the elemental objects having different shapes, it can be avoided that the collapse manner of the aggregate object broken by impact becomes monotonic.

If the outline of each elemental object is made irregular and complicated, for example, the jagged edge of broken pieces may be represented.

(11) In the image generating system or the program according to the present invention, an image of the aggregate object may be generated as an image of a single object before the occurrence of an event, and the image may be generated as an image of the aggregate object formed by a plurality of elemental objects after the occurrence of the event.

The occurrence of an event may include the reception of impact, the hitting of a bullet, the elapse of a predetermined time period or the implementation of a given game condition.

According to the present invention, since an image of a single object is generated before the occurrence of an event, the processing load for the image generation can be reduced. In such a manner, the image generation can be performed more effectively by using properly the single and aggregate objects.

BEST MODES FOR CARRYING OUT THE INVENTION

One preferred embodiment of the present invention will now be described with reference to the drawings. Although the embodiment of the present invention will be described as to a gun game (or shooting game) using a gun-like controller, the present invention is not limited to such a form but may be applied to any of various other forms.

1. Configuration

Figure 1:
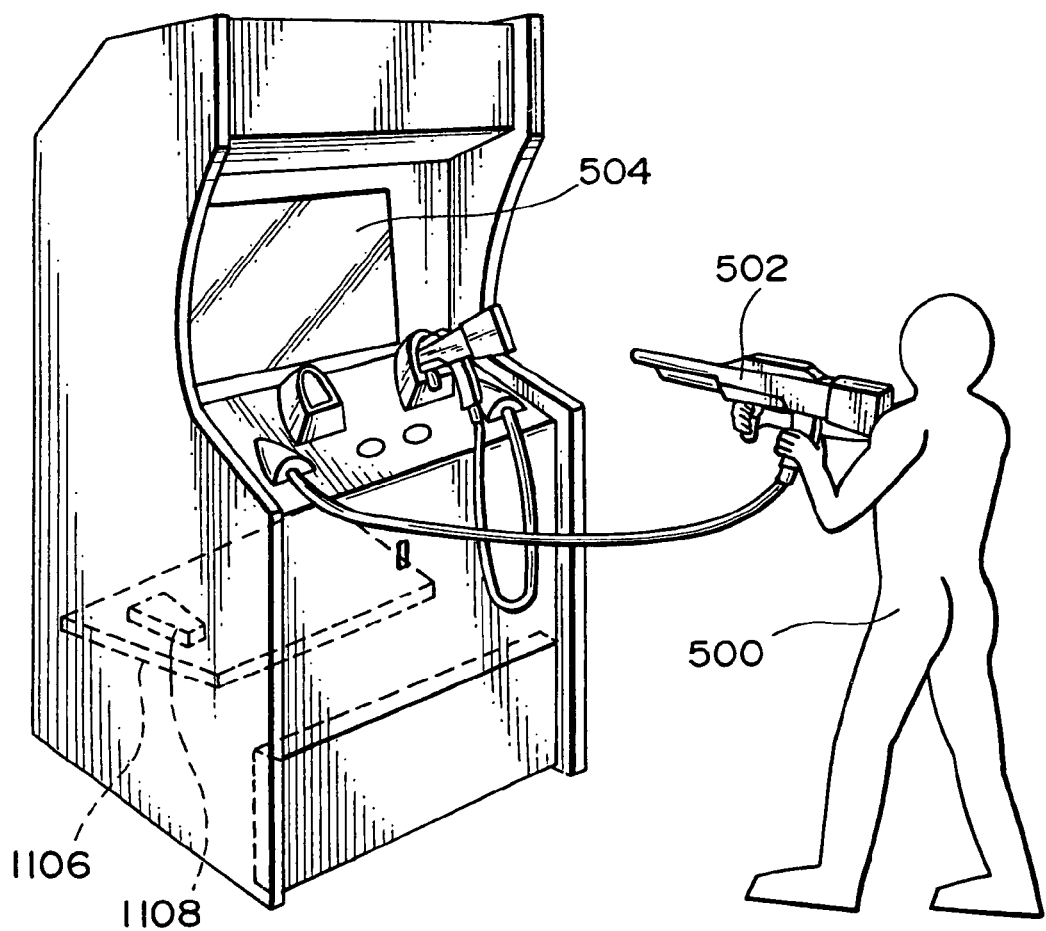
FIG. 1 is a view illustrating the appearance of an arcade game system according to the present invention.

FIG. 1 shows the configuration of an arcade game system to which the present invention is applied.

A player 500 holds a gun-shaped controller (or a shooting device in a broad sense) 502 which is formed similar to a real machine gun. The player 500 can enjoy the gun game by using the gun-shaped controller 500 to shot targets such as enemy characters (or objects in a broad sense) which are displayed on a screen 504.

When the gun-shaped controller 502 is triggered, virtual shots such as bullets or the like will be fanned at high speed. Thus, the player can feel the virtual reality as if he or she is shooting the real machine gun.

A hit position of a shot (or bullet) may be sensed by using a photo-sensor on the gun-shaped controller 502 to sense a scanning ray on the screen or by using a light (or laser) beam emitted from the gun-shaped controller 502 to impinge against a target position which is in turn sensed by any suitable means such as CCD camera.

Figure 2:
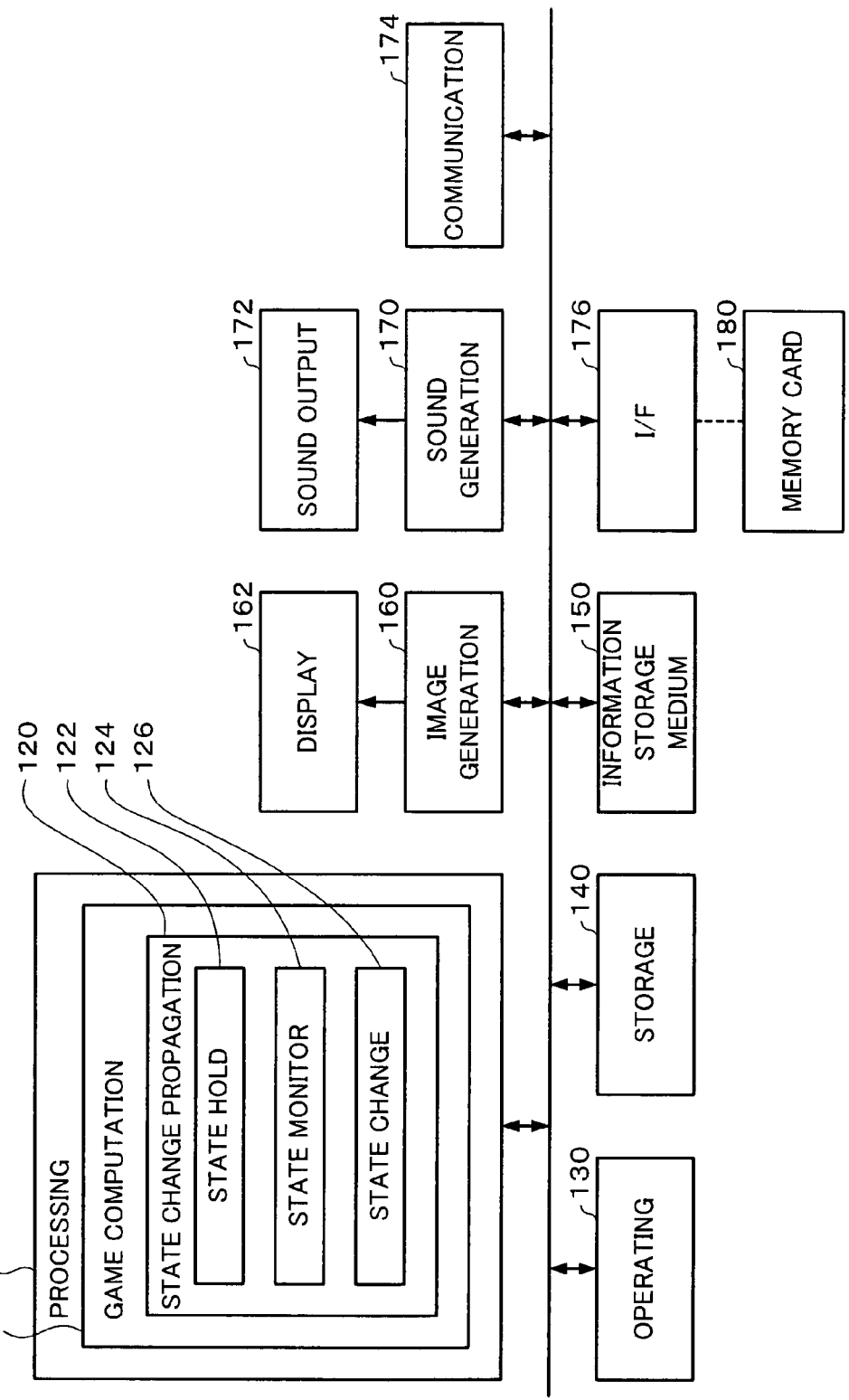
FIG. 2 is a block diagram of an image generating system according to one embodiment of the present invention.

FIG. 2 shows a block diagram of this embodiment. In this figure, this embodiment may comprise at least a processing section 100 or a processing section 100 with a storage section 140 or a processing section 100 with a storage section 140 and an information storage medium 150. Each of the other blocks (e.g., operating section 130, image generation section 160, display section 162, sound generation section 170, sound output section 172, communication section 174, I/F section 176, memory card 180 and so on) may take any suitable form.

The processing section 100 is designed to perform various processings for control of the entire system, commands to the respective blocks in the system, game computation and so on. The function thereof may be implemented by any suitable hardware means such as CPU (CISC type, RISC type), DSP or ASIC (or gate array or the like) or a given program (or game program).

The operating section 130 is used to input operational data from the player and the function thereof may be implemented by any suitable hardware means such as the gun-shaped controller 502 of FIG. 1, a lever, a button, a housing or the like.

The storage section 140 provides a working area for the processing section 100, image generation section 160, sound generation section 170, communication section 174, I/F section 176 and others. The function thereof may be implemented by any suitable hardware means such as RAM or the like.

The information storage medium (which may be a computer utilization storage medium) 150 is designed to store information including programs, data and others. The function thereof may be implemented by any suitable hardware means such as optical memory disk (CD or DVD), magneto-optical disk (MO), magnetic disk, hard disk, magnetic tape, semiconductor memory (ROM) or the like. The processing section 100 performs various processings in the present invention (or this embodiment) based on the information that has been stored in this information storage medium 150. In other words, the information storage medium 150 stores various pieces of information (or programs and data) for implementing (or executing) the means of the present invention (or this embodiment) which is particularly represented by the block included in the processing section 100.

Part or the whole of the information stored in the information storage medium 150 will be transferred to the storage section 140 when the system is initially powered on. The information stored in the information storage medium 150 may contain at least one of program code set for processing the present invention, image information, sound information, shape information of objects to be displayed, table data, list data, player information, command information for the processings in the present invention, information for performing the processings according to the commands and so on.

The image generation section 160 is designed to generate and output various images toward the display section 162 according to instructions from the processing section 100. The function thereof may be implemented by any suitable hardware means such as image generating ASIC, CPU or DSP or according to a given program (or image generating program) or based on image information.

The sound generation section 170 is designed to generate and output various sounds toward the sound output section 172 according to instructions from the processing section 100. The function thereof may be implemented by any suitable hardware means such as sound generating ASIC, CPU or DSP or according to a given program (or sound generating program) or based on sound information (waveform data and the like).

The communication section 174 is designed to perform various controls for communication between the game system and any external device (e.g., host machine or other image generating system). The function thereof may be implemented by any suitable hardware means such as communication ASIS or CPU or according to a given program (or communication program).

Information for implementing the processings in the present invention (or this embodiment) may be delivered from an information storage medium included in a host machine (or server) to the information storage medium 150 through a network and the communication section 174. The use of such an information storage medium in the host device (or server) falls within the scope of the invention.

Part or the whole of the function in the processing section 100 may be implemented by the function of the image generation section 160, sound generation section 170 or communication section 174. Alternatively, part or the whole of the function in the image generation section 160, sound generation section 170 or communication operating section 174 may be implemented by the function of the processing section 100.

The I/F section 176 serves as an interface for information interchange between the game system and a memory card (or a portable information storage device including a portable game machine in a broad sense) 180 according to instructions from the processing section 100. The function thereof may be implemented by a slot into which the memory card is inserted, a data write/read controller IC or the like. If the information interchange between the game system and the memory card 180 is to be implemented in a wireless manner (e.g., through infra-red communication), the function of the I/F section 176 may be implemented by any suitable hardware means such as semiconductor laser, infra-red sensor or the like.

The processing section 100 further comprises a game computation section 110.

The game computation section 110 is designed to perform various processes such as coin (or charge) reception, setting of various modes, game proceeding, setting of scene selection, determination of the position and rotation angle (about X-, Y- or Z-axis) of an object, determination of the view point and visual line (direction), regeneration (or generation) of the motion, arrangement of the object within the object space, hit checking, computation of the game results (or scores), processing for causing a plurality of players to play in a common game space, various game computations including game-over and other processes, based on operational data from the operating section 130 and according to the data and game program from the memory card 180.

The game computation section 110 includes a state change propagation section 120.

The state change propagation section 120 is designed to propagate the change of state in a given elemental object to the other elemental objects belonging to the same aggregate object. The image generation section 160 is designed to generate an image by changing at least one of the shape, color, position, rotation angle, direction, moving direction and moving speed of each elemental object, based on the change of state in that elemental object.

The state change propagation section 120 includes a state hold section 122, a state monitor section 124 and a state change section 126.

The state hold section 122 is designed to hold the state of each elemental object in a state buffer exclusively provided for the elemental object.

The state monitor section 124 is designed to monitor the states of the other elemental objects belonging to the same aggregate object.

The state change section 126 is designed to change the state of a given elemental object when a given event occurs. The state change section 126 is also designed to change the state of a given elemental object even when the states of the other elemental objects having a given relationship relative to the given elemental object are changed.

The given relationship may be the positional relationship between the elemental objects, for example. Whether or not the state of one elemental object should be changed when the states of the other elemental objects having a given relationship relative to the one elemental object are changed may randomly be determined. The state may be changed with a given time lag from when the states of the other elemental objects are changed. The first state of one elemental object may be changed to the second state after a given time period has elapsed.

The image generation section 160 may generate the image of a changed elemental object based on a given change pattern which is selected from a plurality of previously provided change patterns for the change of state thereof. A plurality of shaped elemental objects may be assembled without clearance to form an aggregate object. The generation of image is such that the image of a single object is formed before a given event occurs in the aggregate object while the images of plural elemental objects are generated to form the aggregate object after the given event has occurred.

The image generating system of the present invention may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals interconnected through a network (transmission line or communication line) may be used in the present invention.

2. Features and operations of this embodiment

The features and operations of this embodiment of the invention will be described with reference to when a glass plate is broken into pieces by a bullet.

Figure 3:
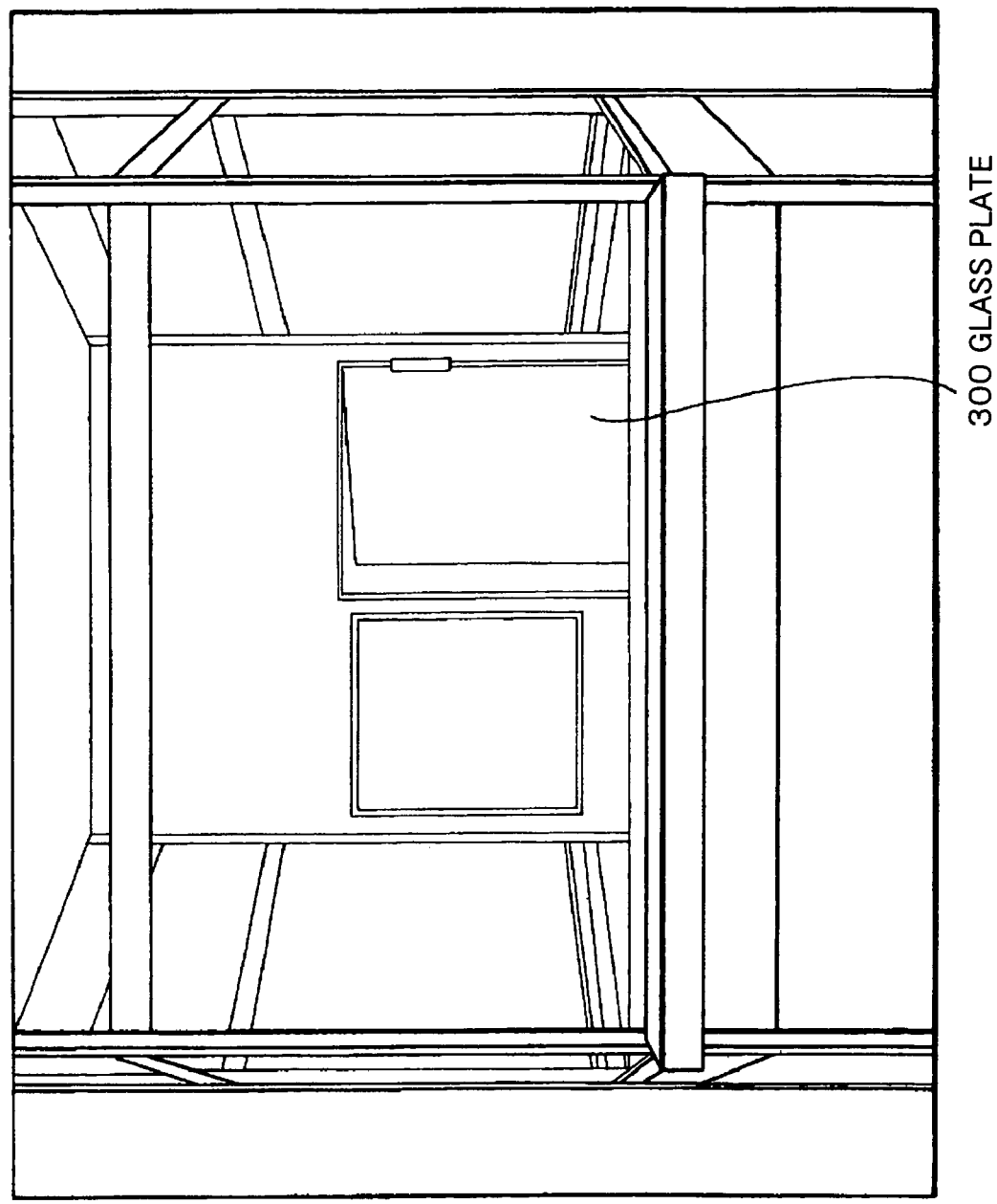
FIG. 3 illustrates a game scene in the present invention.
Figure 4:
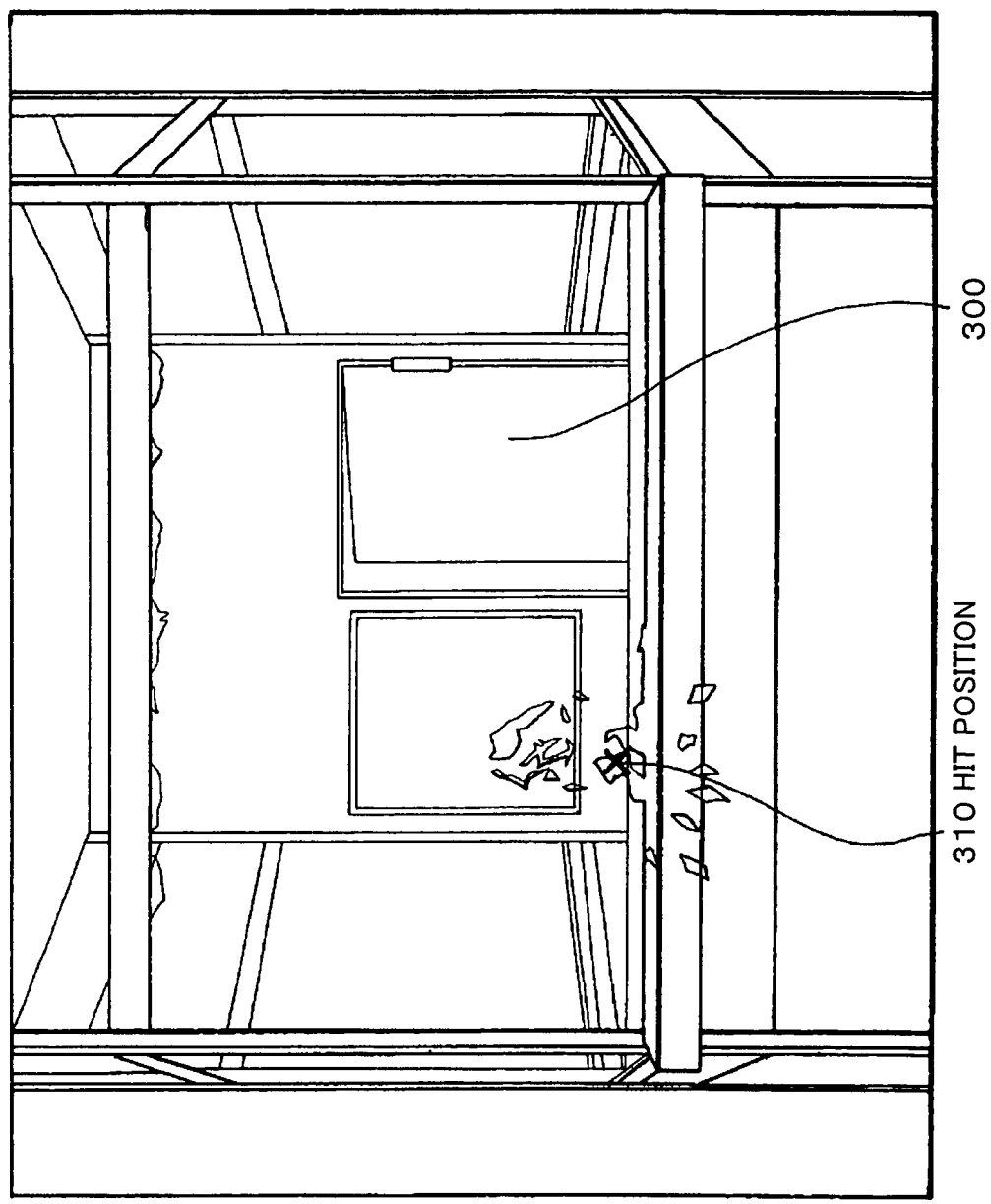
FIG. 4 illustrates another game scene in the present invention.
Figure 5:
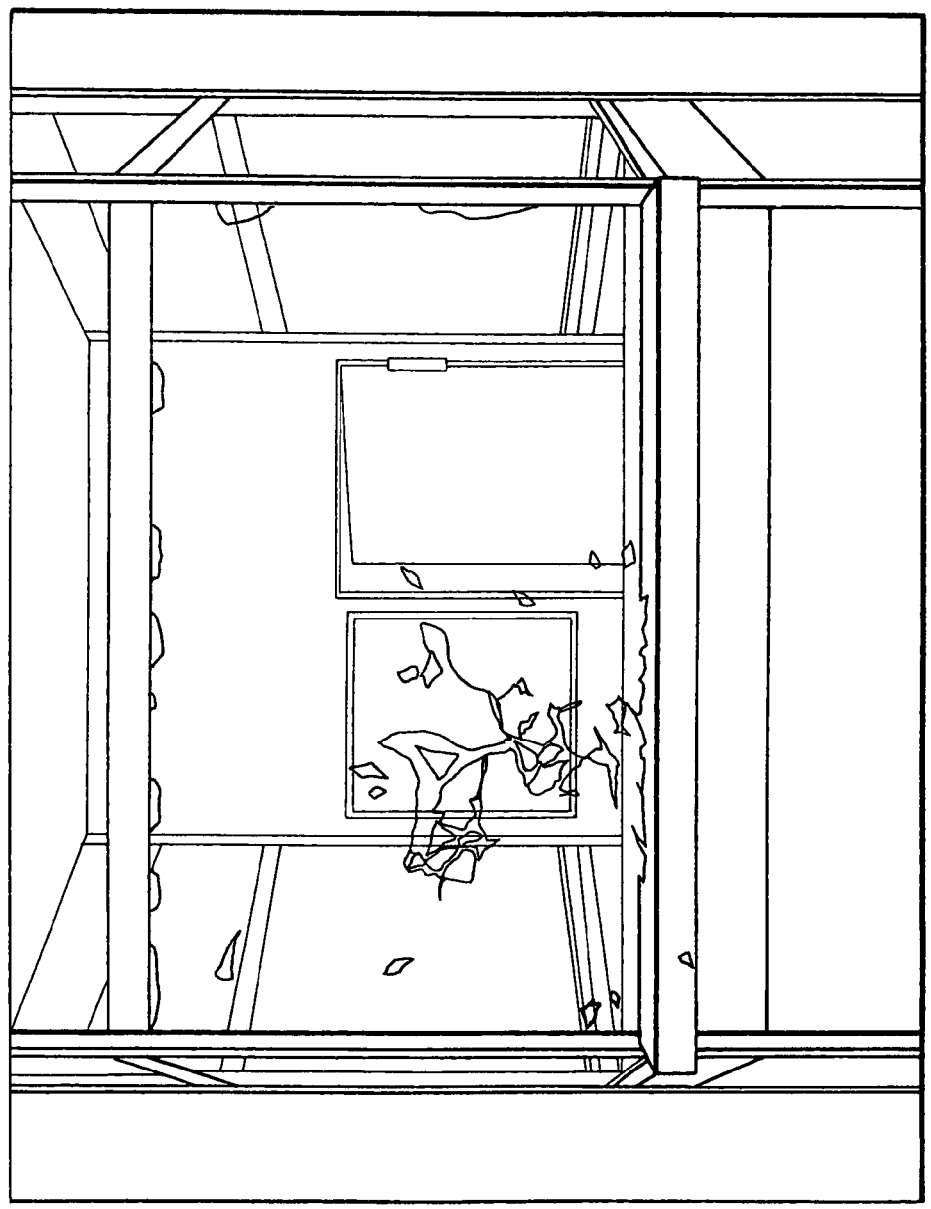
FIG. 5 illustrates still another game scene in the present invention.
Figure 6:
FIG. 6 illustrates a further game scene in the present invention.
Figure 7:
FIG. 7 illustrates a further game scene in the present invention.
Figure 8:
FIG. 8 illustrates a further game scene in the present invention.
Figure 9:
FIG. 9 illustrates a further game scene in the present invention.

FIGS. 3–10 show various game scenes in the present invention. The game scene 300 of FIG. 3 shows a glass plate which will be broken into pieces. The game scene 300 of FIG. 4 shows the state of the glass plate immediately after it has received a bullet near 310.

Figure 10:
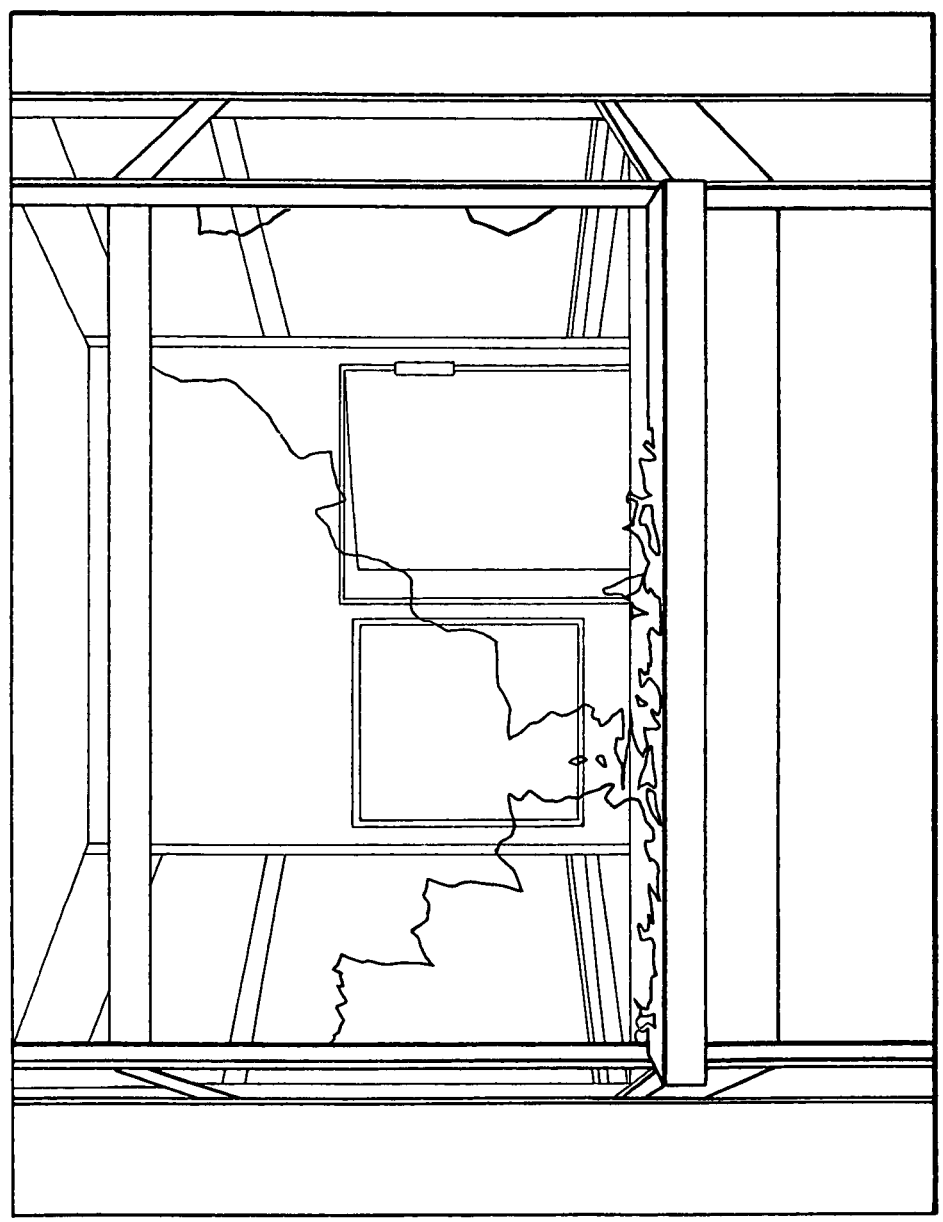
FIG. 10 illustrates a further game scene in the present invention.

According to the present invention, an image may be generated in which a glass plate begins to be broken from its portion surrounding a bullet hit position and thereafter the extent of breakage increases in the upward direction for about one or two seconds, as shown in FIGS. 50–10. This can provide a real representation in which the glass plate begins to be broken from the bullet hit position and thereafter the extent of breakage spreads.

An example of a process for generating such images as shown in FIGS. 3–10 according to the present invention will be described.

Figure 11A:
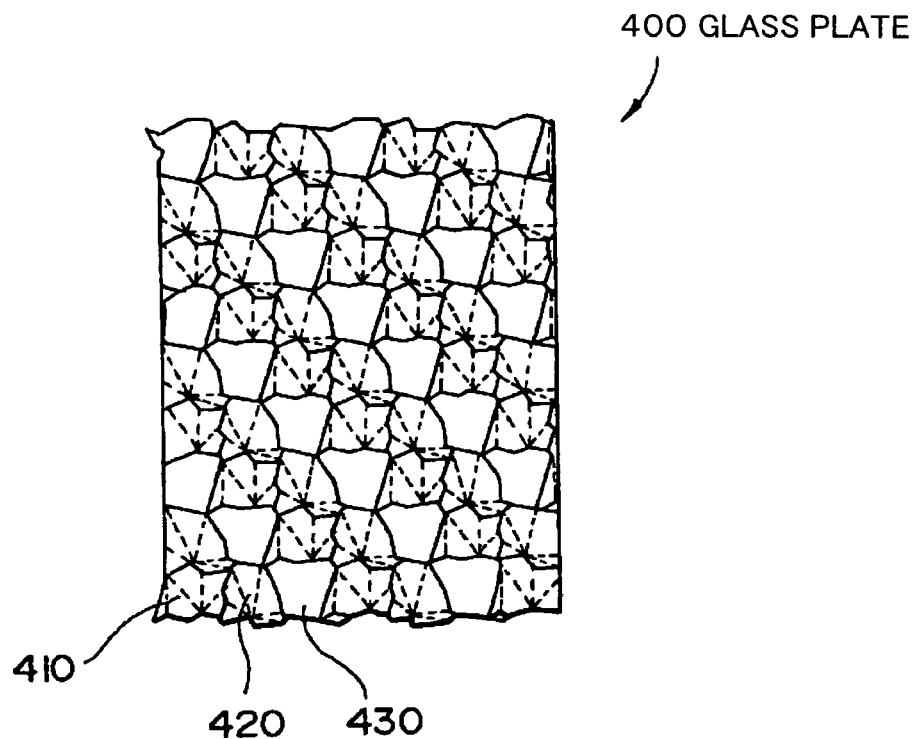
FIGS. 11A and 11B illustrate a glass plate object broken into pieces according to the present invention.
Figure 11B:
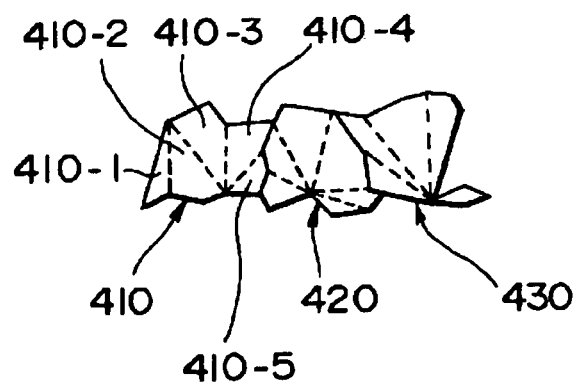

FIGS. 11A and 11B illustrate an object of glass plate which will be broken into pieces according to the present invention.

An object of glass plate 400 has previously been divided into elemental objects representing fine glass pieces as shown by 410, 420, 430 in FIG. 11A. These elemental objects are assembled without clearance to represent a single glass plate.

It is preferred that a single object of glass plate is formed prior to reception of impact while this object is divided into elemental objects after impact. Thus, the load in computation can be reduced by generating the image of a single object prior to impact, resulting in efficient generation of image.

FIG. 11B illustrates the types of the elemental objects of glass pieces. In this form, three types of different elemental objects representing glass pieces as shown by 410, 420, 430 may be used to form an aggregate object of glass plate 400. Each of the elemental objects representing the glass pieces 410, 420, 430 is formed by a plurality of polygon faces. For example, one of the elemental objects 410 may be formed by polygon faces 410-1, 410-2, 410-3, 410-4 and 410-5.

Such an assembly of different glass pieces is for providing complex manner and shape on breakage.

Figure 12:
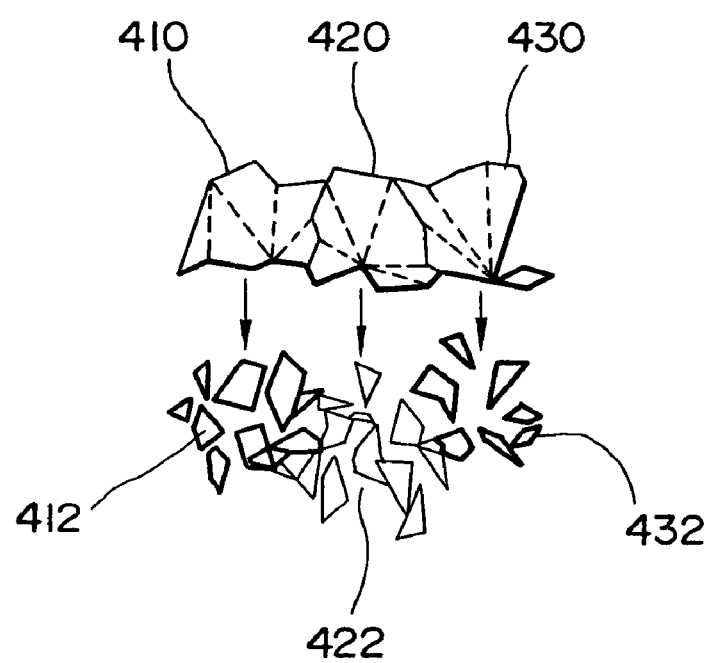
FIG. 12 illustrates a pattern of broken glass pieces each of which is an elemental object.

FIG. 12 illustrates a pattern in which each elemental object is broken into glass pieces. Such a pattern will be referred to "breakage pattern" in which a glass plate is collapsed by a hitting bullet. More particularly, when a bullet hits a glass plate, one of the elemental objects representing the glass pieces is removed and the image of breakage pattern is then generated. This breakage pattern is downwardly moved as the frame proceeds.

Figure 13C:
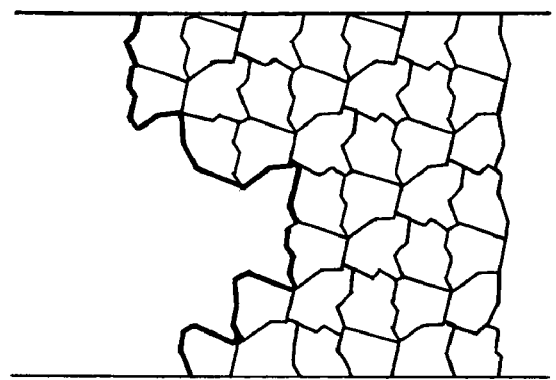
FIGS. 13A, 13B and 13C illustrate the progress of collapsing the glass plate.
Figure 13B:
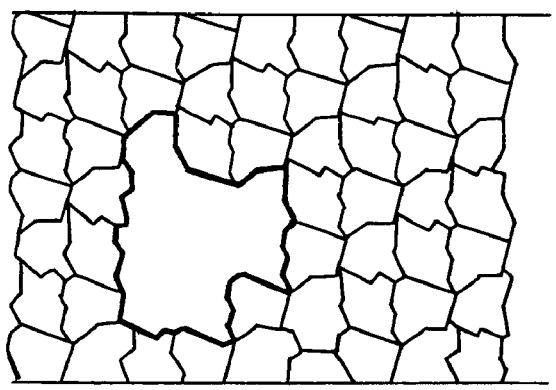
Figure 13A:
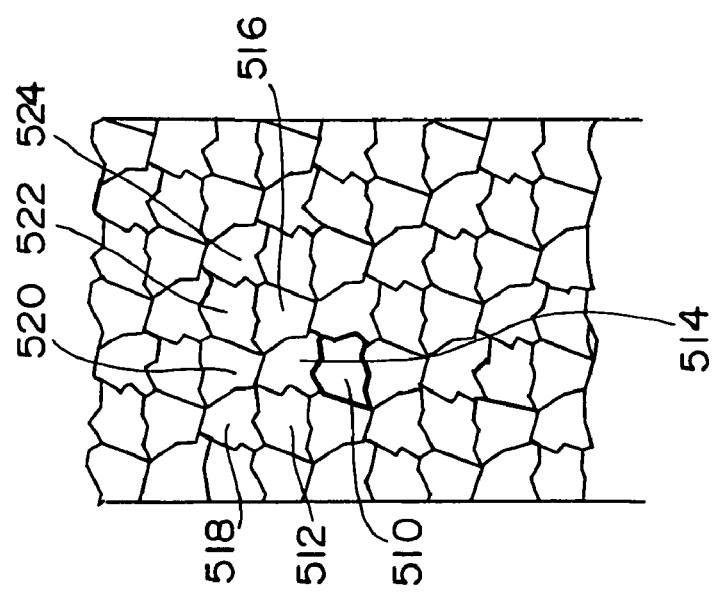

FIGS. 13A, 13B and 13C illustrate a manner in which the collapse or breakage of the glass plate proceeds. For example, when a bullet hits the glass plate at a position near 510 in FIG. 13A, an elemental object representing a glass piece at the position of 510 is first removed and the image of the corresponding breakage pattern is then generated. After a delay of a few frames, other elemental objects representing glass pieces 512–524 located above the position 510 are then removed (see FIG. 13B). An image of the corresponding breakage pattern is then generated. After a further delay of several frames, further elemental objects of glass pieces located above the removed elemental objects of glass pieces 512–524 are removed (see FIG. 13C). A further image of the corresponding breakage pattern is generated.

In such a manner, the glass plate hit by the bullet begins to collapse at a position near the bullet hit position. This collapse gradually propagates to the upper portion of the glass plate.

According to the present invention, each of the elemental objects representing glass pieces has its state information so as to implement such a collapse of glass as described above. The generation of image is carried out based on such state information as will schematically be described below.

Figure 14:
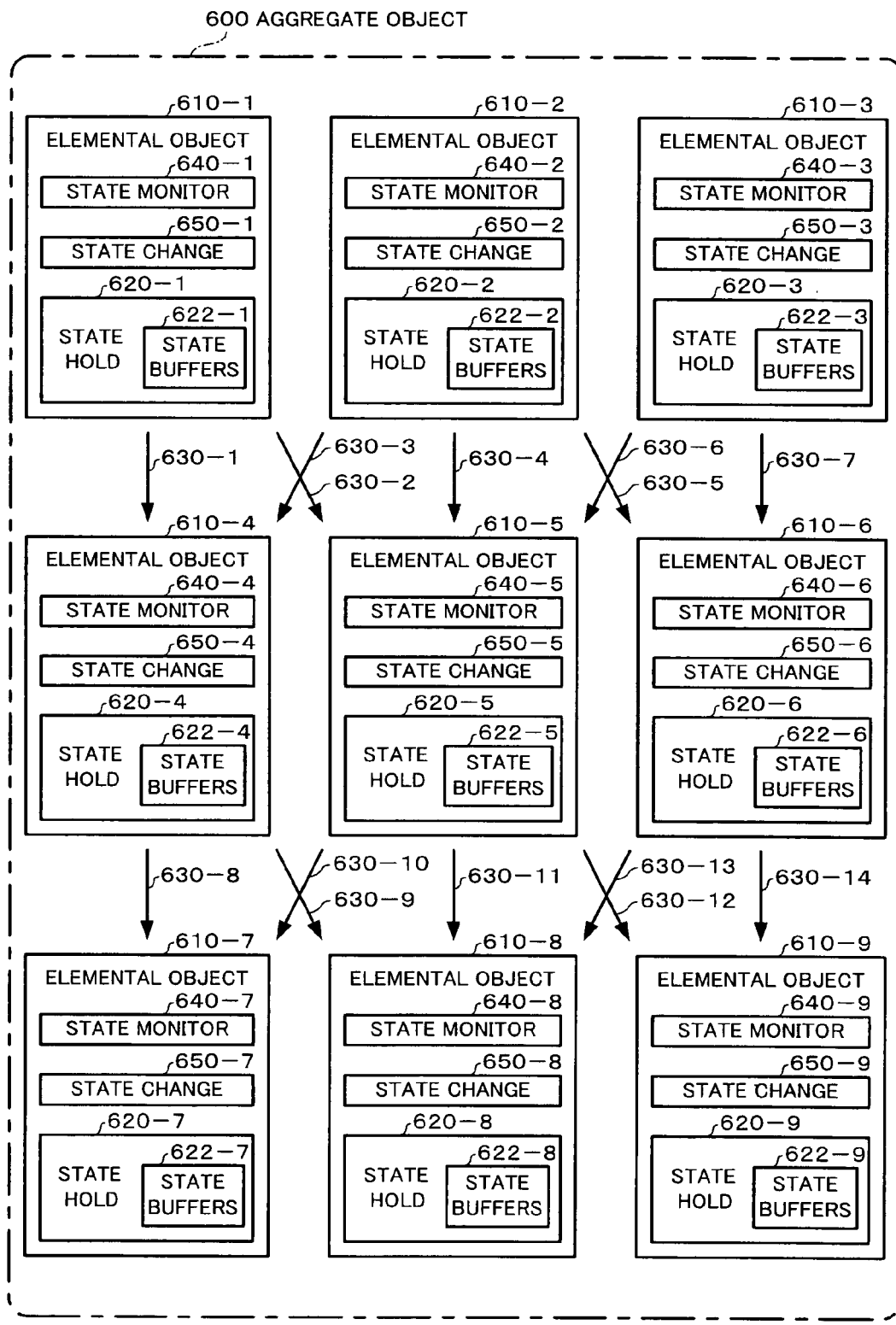
FIG. 14 diagrammatically illustrates the positional relationship between an aggregate object (or glass plate) and elemental objects (or glass pieces) and the manner of monitoring and changing their states.

FIG. 14 diagrammatically shows the positional relationship an aggregate object (or glass plate) and elemental objects (or glass pieces) according to the present invention and the forms of monitoring and changing the state.

Reference numeral 600 represents the aggregate object while reference numerals 610-1 to 610-9 denote elemental objects forming the aggregate object. In this embodiment, for example, the aggregate object may correspond to the glass plate 400 shown in FIG. 11A while the elemental objects may correspond to the glass pieces 410, 420, 430 forming the glass plate 400.

Each of the elemental objects 610-1 to 610-9 has means, 620-1 to 620-9, for holding its own state. The present state in each of the elemental objects is held in the corresponding one of state buffers 622-1 to 622-9 for each elemental object.

Each of the elemental objects 610-1 to 610-9 also has state monitor means 640-1 to 640-9 for monitoring the other elemental objects belonging to the same aggregate object and state change means 650-1 to 650-9 for changing its own state based on the states of the other elemental objects belonging to the same aggregate object and having a predetermined relationship relative to the each elemental object.

First of all, the relationship between the state of each of the elemental objects held in the corresponding state buffer 622-1 to 622-9 and an image generated therefor will be described. The state buffer 622-1 to 622-9 for each of the elemental objects representing the glass pieces holds either of three states, "initial", "breakage" or "end-of-breakage". The "initial" state means that the glass pieces are placed at their normal positions to form an unbroken glass plate. The "breakage" state means that the glass pieces are removed from their normal positions and that the image of the glass plate is replaced by a breakage pattern which represents the glass pieces before they fall onto the floor. The "end-of-breakage" state means that the glass pieces are on the floor after fallen.

According to the present invention, the generation of image will be carried out based on the states held for each of the elemental objects of glass pieces after the glass plate has received the bullet.

Figure 15:
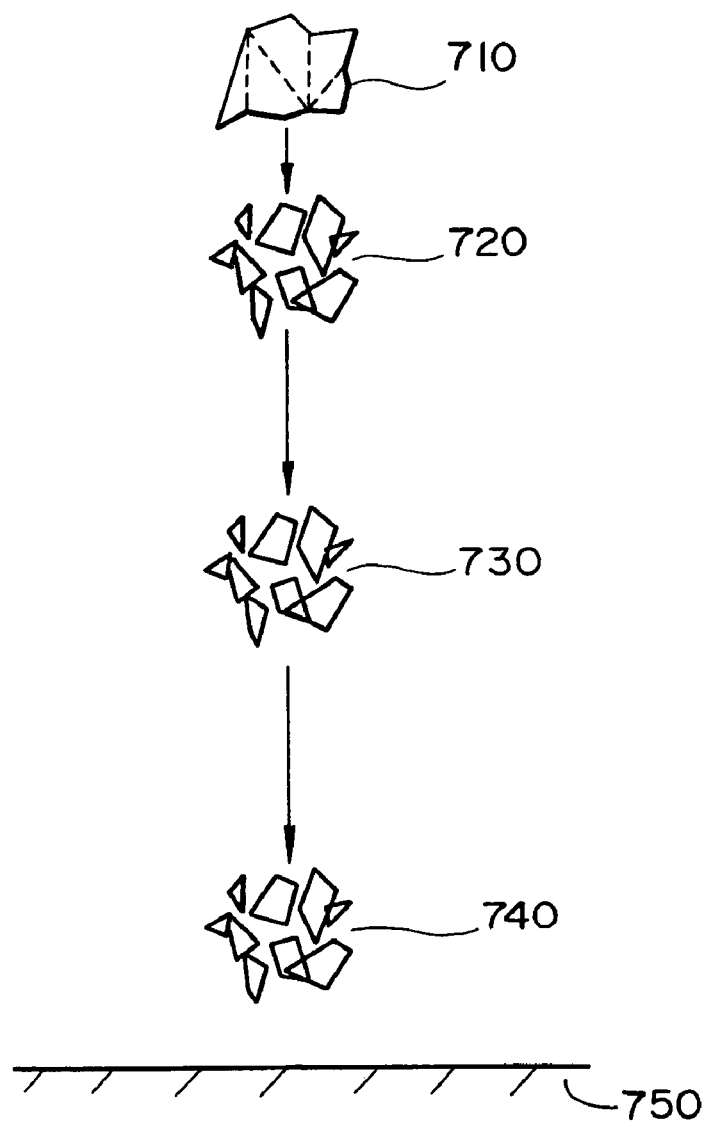
FIG. 15 illustrates the transition of image when a glass plate is being broken into pieces.

FIG. 15 illustrates the transition between the images generated when the glass plate is being broken into pieces.

Reference numeral 710 represents an image to be generated when the elemental objects of the glass pieces are on their initial states. It corresponds to the images of glass pieces in FIGS. 11A and 13A in their predetermined positions.

Reference numerals 720 to 740 of FIG. 15 represent the images of the glass pieces created when the glass plate is broken. Depending on time elapsed after the glass plate is broken into pieces, the falling of glass pieces proceeds as shown by 720, 730 and 740. The image of the breakage pattern is represented at a position nearer the floor or ground. Under such a condition, the glass pieces have been removed from their locations on which they originally exist, as shown by 510 in FIG. 13A.

In the end-of-breakage state, both the images of the normal condition and breakage pattern will not be represented. As shown in FIG. 13C, for example, the image of the partially broken glass plate may be generated on the screen with the glass pieces being removed from their normal states.

Each of the state monitor means will monitor the state of the corresponding glass piece as follows. Reference numerals 630-1 to 630-14 of FIG. 14 represent the directions of the elemental objects to be monitored. As shown, the state monitor means 640-1 to 640-9 for each of the elemental objects monitors the states of the elemental objects located downward or slantly downward.

The state of each of the elemental objects is changed based on the states of the other elemental objects belonging to the same aggregate object and having a predetermined relationship relative to that elemental object. For example, if the state of the first elemental object located downward or slantly downward as viewed from the second elemental object is changed from its initial state to its breakage state, a predetermined time delay may be taken before the second elemental object is changed from its initial state to its breakage state.

In such a manner, there can be generated an image in which the glass plate is broken into pieces by being hit by a bullet, the extent of breakage propagating to the upper portion of the glass plate and the glass pieces being separately collapsed down.

Figure 16:
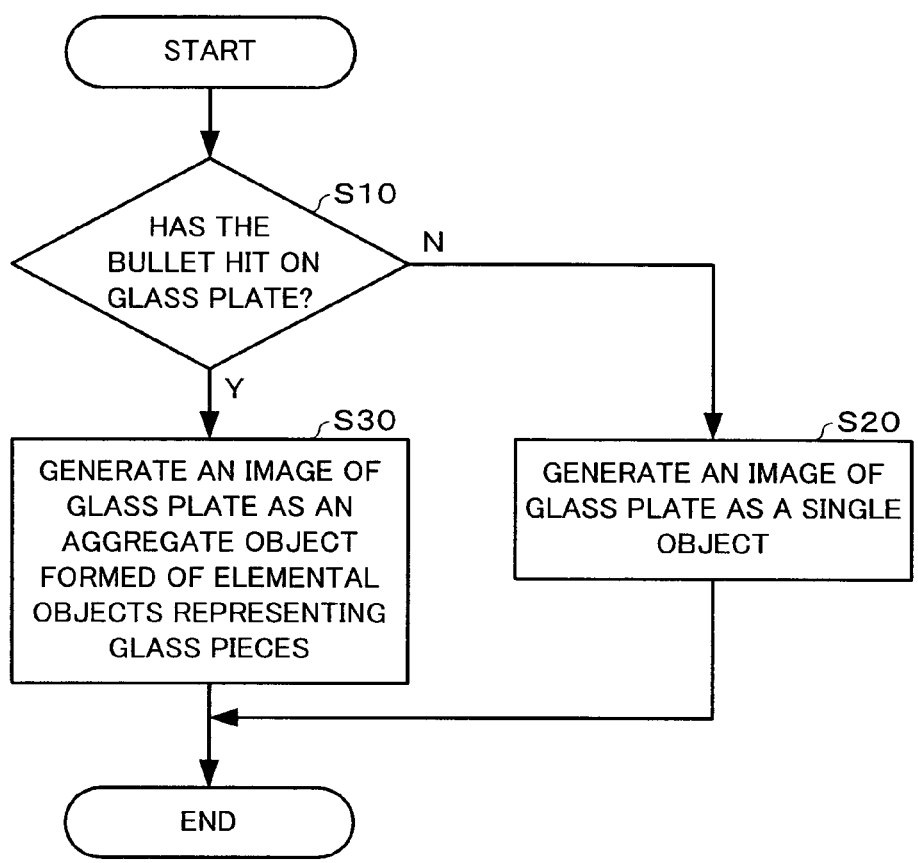
FIG. 16 is a flowchart illustrating an operation in the present invention.
Figure 17:
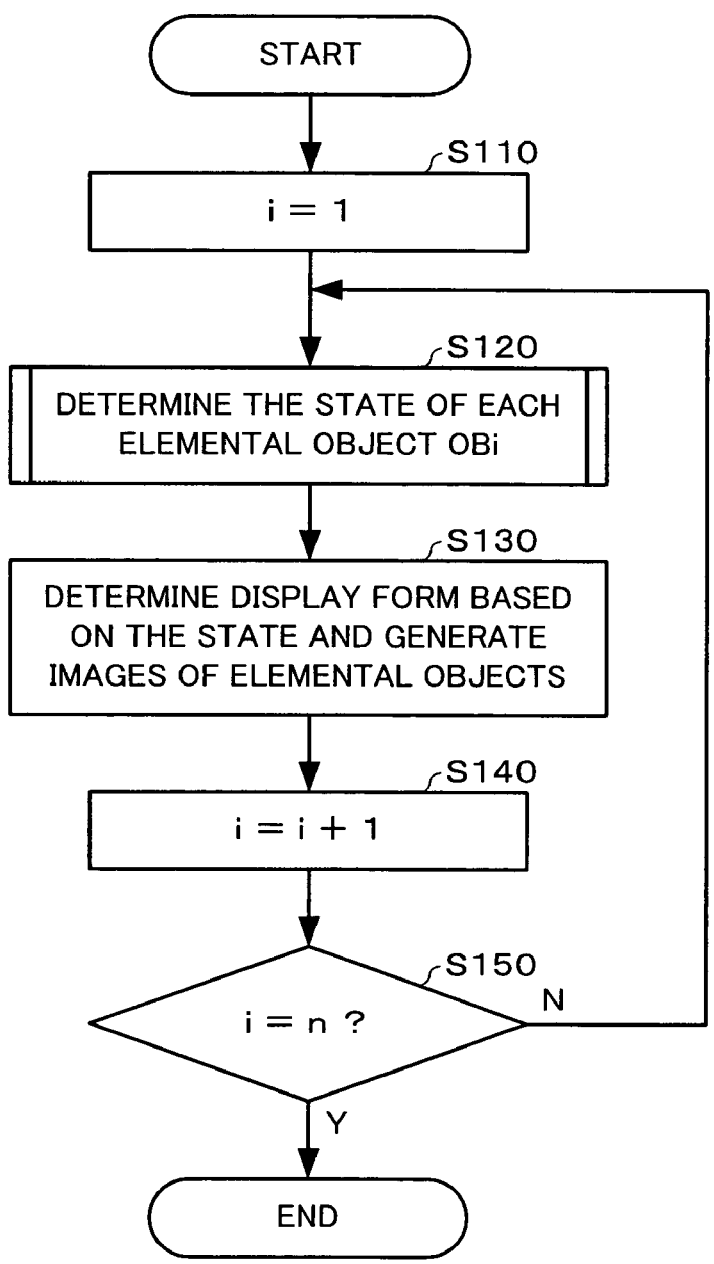
FIG. 17 is a flowchart illustrating another operation in the present invention.
Figure 18:
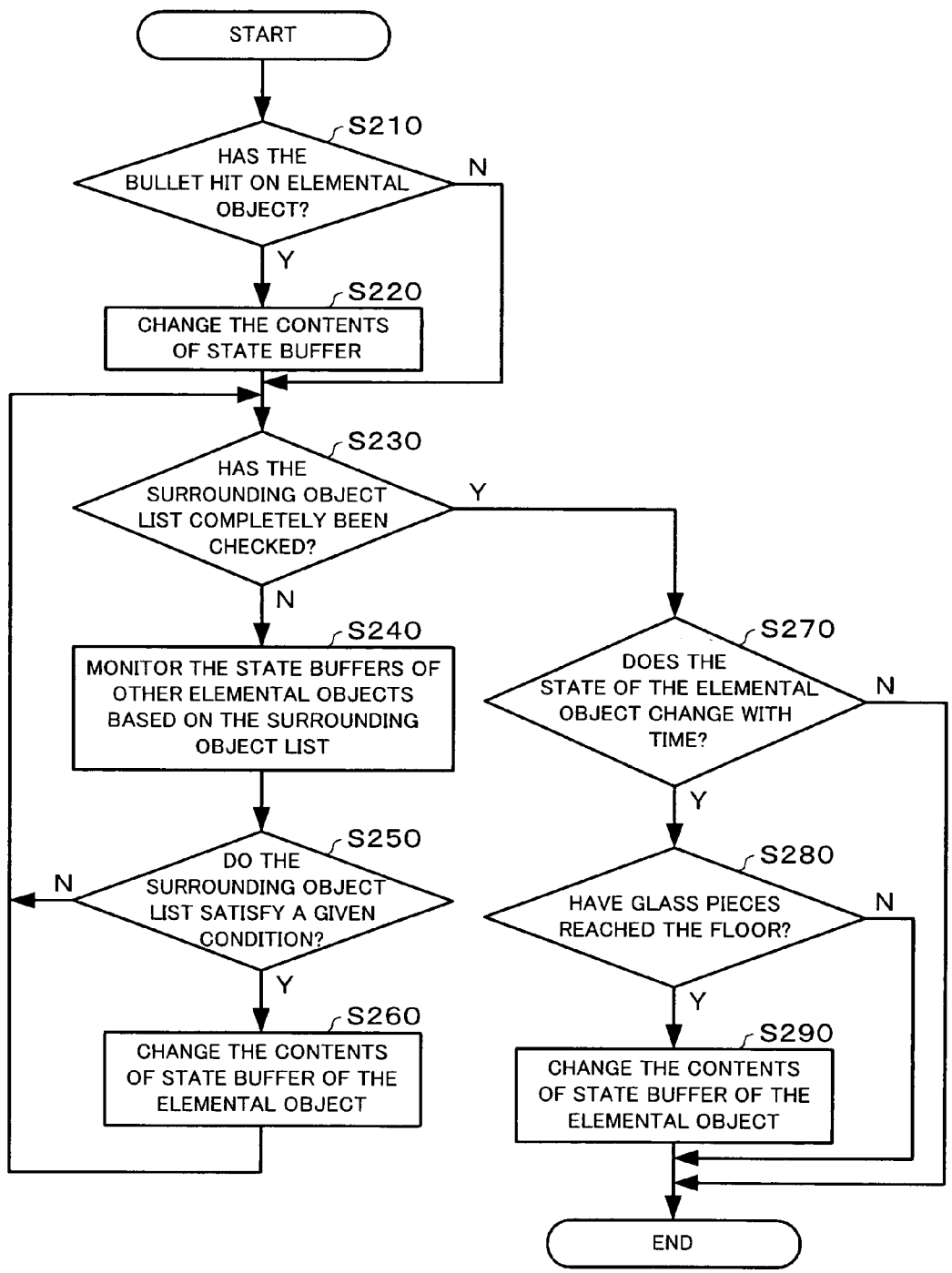
FIG. 18 is a flowchart illustrating still another operation in the present invention.

FIGS. 16 to 18 are flowcharts illustrating various operations in one embodiment of the present invention. In this embodiment, the images representing the glass plate before and after broken are generated for each frame in the following manner.

Before a bullet hits the glass plate at any location, the glass plate is imaged as a single object (steps S10 and S20).

After a bullet hits the glass plate at any location, the glass plate is imaged as an aggregate object formed by a plurality of elemental objects representing glass pieces (steps S10 and S30).

FIG. 17 is a flowchart illustrating the details of the process in the step S30 of FIG. 17.

First of all, a variable i for counting the number of elemental objects forming the aggregate object is set (step S110).

The state of each of the elemental objects Obi is then determined (step S120) to determine the display form based on the state of that elemental object. The image of that elemental object is then generated (step S130).

The variable i is incremented. If the above-mentioned process has completed for all the elemental objects forming the aggregate object, the procedure is terminated. If there exists any elemental object not completed the process, the procedure is returned to the step S120 and the process is repeated (steps S140 and S150).

FIG. 18 is a flowchart illustrating the details of the state determination for each elemental object Obi in the step S120 of FIG. 17. The following procedure is performed for each of the glass pieces which are elemental objects.

If a bullet hits one of the elemental objects, the contents of the state buffer for that elemental object are changed from "initial" to "breakage" (steps S210 and S220).

A list relating to the elemental objects surrounding the one elemental object and to be monitored (which will be referred to "the surrounding object list") is checked (steps S230–S260) For example, if the one elemental object is an elemental object 610-1 in FIG. 14, the surrounding object list may contain the other elemental objects 610-4 and 610-5. If the one elemental object is an elemental object 610-2 in FIG. 14, the surrounding object list may contain the other elemental objects 610-4, 610-5 and 610-6.

The state buffers for the other elemental objects contained in the surrounding object list are monitored until the entire surrounding object list has been checked (step S240).

If the surrounding elemental objects satisfy a predetermined condition, the contents of the state buffer for the one elemental object is changed (steps S250 and S260). Such a predetermined condition may include the positional relationship, the time elapsed after the state change, the number of frames etc. in addition to the states of the other elemental objects.

For example, the surrounding object list may contain the greatest common divisor of the elemental objects to be monitored. If the condition is to be further narrowed with the positional relationship or the like depending on the form of change, it may be required to consider the positional relationship.

If it is wanted to perform the change with a time lag, it may be required to consider time counted from the change of state or the number of frames.

Furthermore, the change may randomly be performed. Whether or not the state should be changed after a predetermined condition has been satisfied may randomly be carried out through random number.

In this embodiment, when the downward or slantly downward elemental objects are in the breakage state, the contents of the state buffer for any upward elemental object are changed from "initial" to "breakage". However, such a change will be performed at the fourth frame counted from when the other elemental objects are changed from the "initial" state to the "breakage" state since there is the time lag.

If the change is to be performed with the time lag, the number of frames used after the state has been changed may be written into the corresponding state buffer.

If the state of the elemental object has been changed under the relationship relative to the other elemental objects after all the surrounding object list has been checked, the state of the elemental object in the relationship relative to itself is then changed (steps S270–S290). The change of state in the latter relationship may mean such a change that one glass piece transitions from its "breakage" state to its "end-of-breakage" state, for example. This is because once one glass piece is in its breakage state, the "end-of-breakage" state is attained independently of the states of the other elemental objects when that glass piece reaches the floor.

First of all, it is checked whether or not the state of an elemental object is variable through time (step S270). If the state of each of the elemental objects is in "breakage" state, it becomes the "end-of-breakage" state when reaching the floor after passage of a predetermined time. Although the state of the elemental object is variable through time when it is in "breakage" state, no change will be performed if it is in "initial" or "end-of-breakage" state. Based on it, it is checked whether or not the state of that elemental object is in "breakage" state.

If the contents of the state buffer in an elemental object is in the "breakage" state, the distance between its breakage pattern and the floor is calculated. If this distance is zero, the contents of its own state buffer is changed from "breakage" to "end-of-breakage" (steps S280 and S290).

Such a technique of the present invention as described above is not limited to a case where an image showing that a single object as viewed as a glass plate is broken into pieces is generated. For example, the present invention may be applied to a case where an image showing that an object representing a stack of things is collapsed by a bullet is generated, as will be described below.

Figure 19:
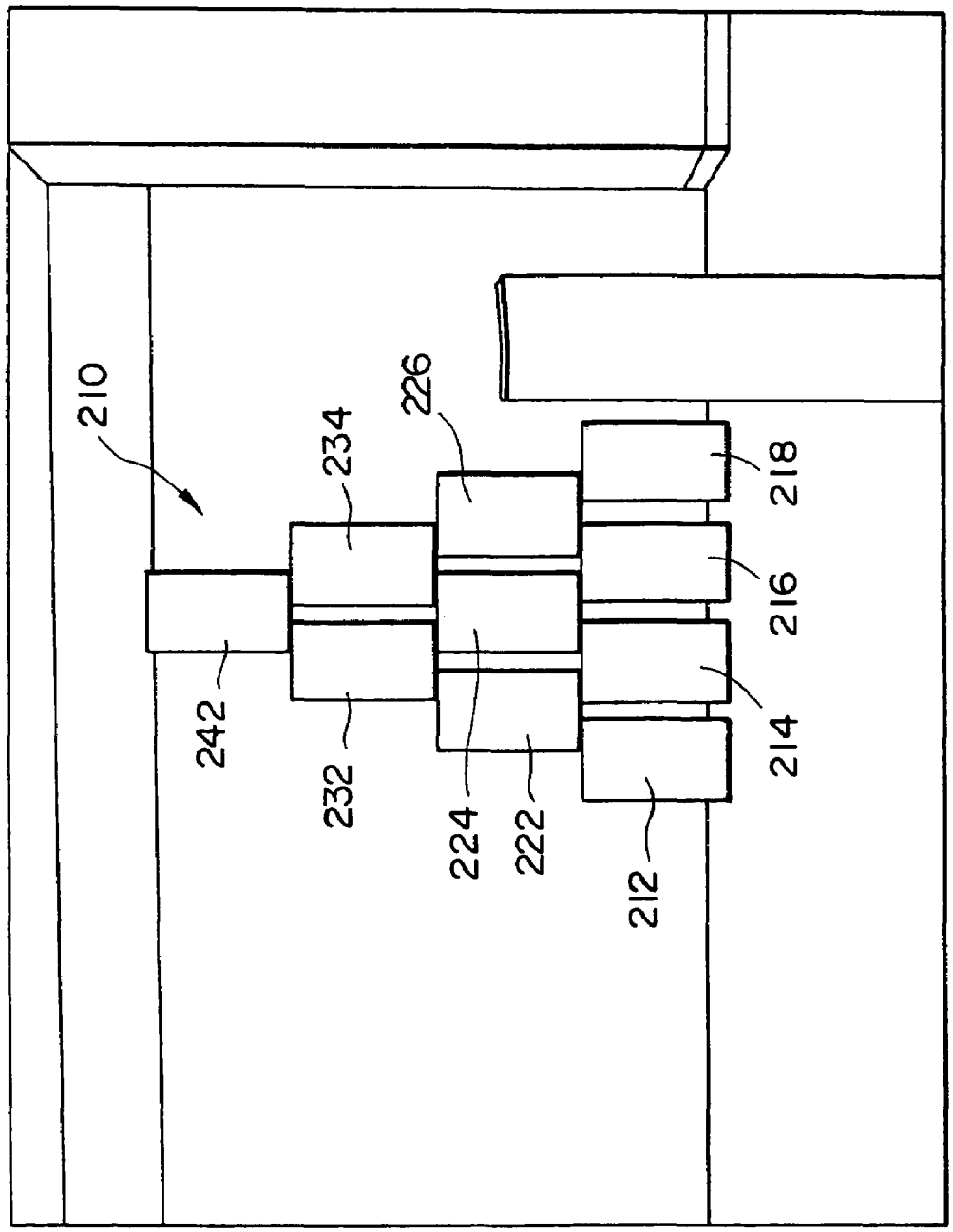
FIG. 19 illustrates a further game scene in the present invention.

FIGS. 19 to 25 illustrate game scenes according to another embodiment of the present invention. Reference numeral 210 of FIG. 19 represents a stack of video cases. This stack includes nine stacked video cases to form an aggregate object 210. Each of the video cases 212–242 is an elemental object. It is assumed in FIG. 19 that each of the elemental objects or video cases 212–214 is in its initial state. The term "initial state" herein means that each video case is in a predetermined static position within the aggregate object.

Figure 20:
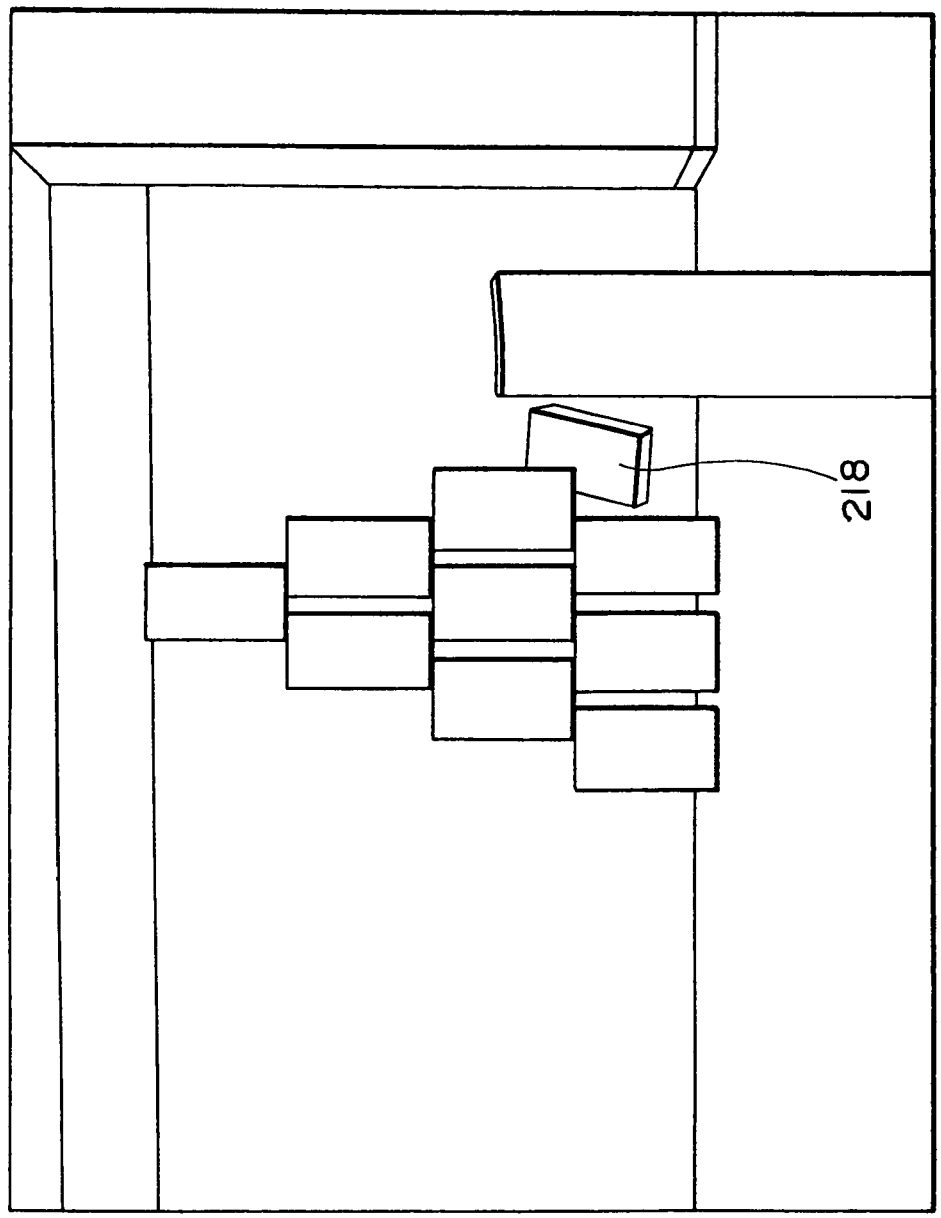
FIG. 20 illustrates a further game scene in the present invention.

FIG. 20 shows that a bullet hits one elemental object or video case 218 with the video case being tumbled. At this time, the video case 218 is changed from its initial state to its tumbled state, resulting in an image representing the tumbled video case.

The other elemental objects are still in their initial state.

Figure 21:
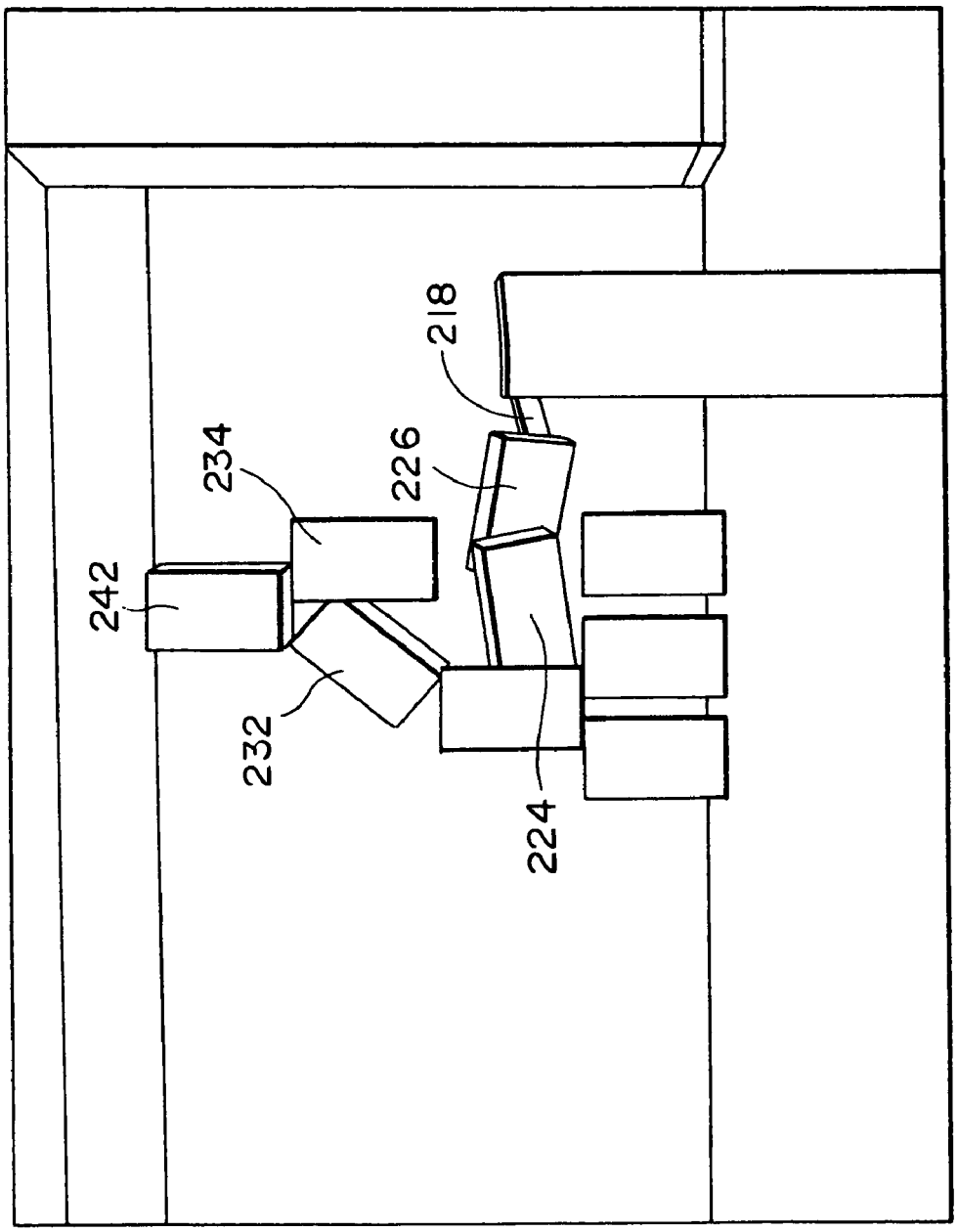
FIG. 21 illustrates a further game scene in the present invention.

FIG. 21 shows another picture representing that the tumbled state propagates to upper video cases 224, 226 and 232.

Figure 22:
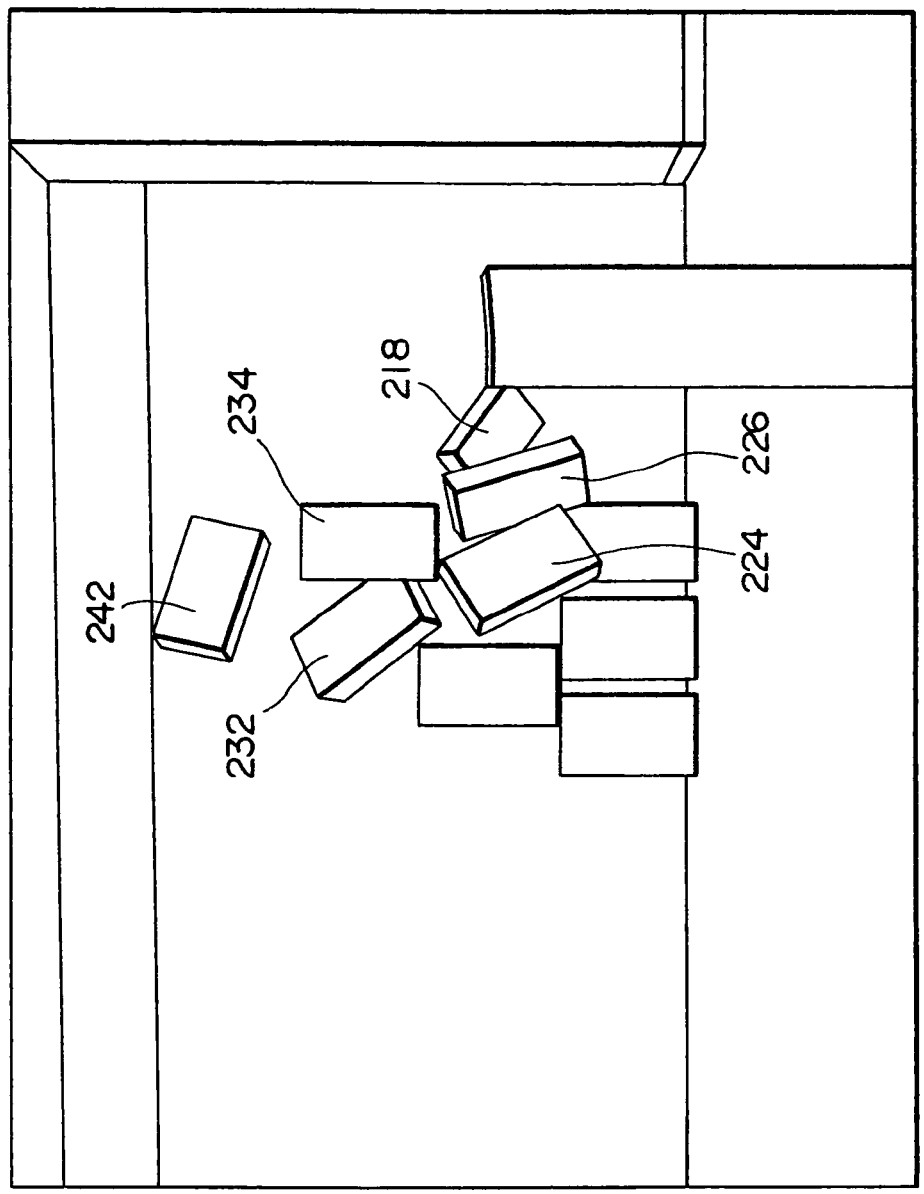
FIG. 22 illustrates a further game scene in the present invention.

FIG. 22 shows still another picture representing that the tumbled state further propagates to a lateral video case 234 and a further upward video case 242.

Figure 23:
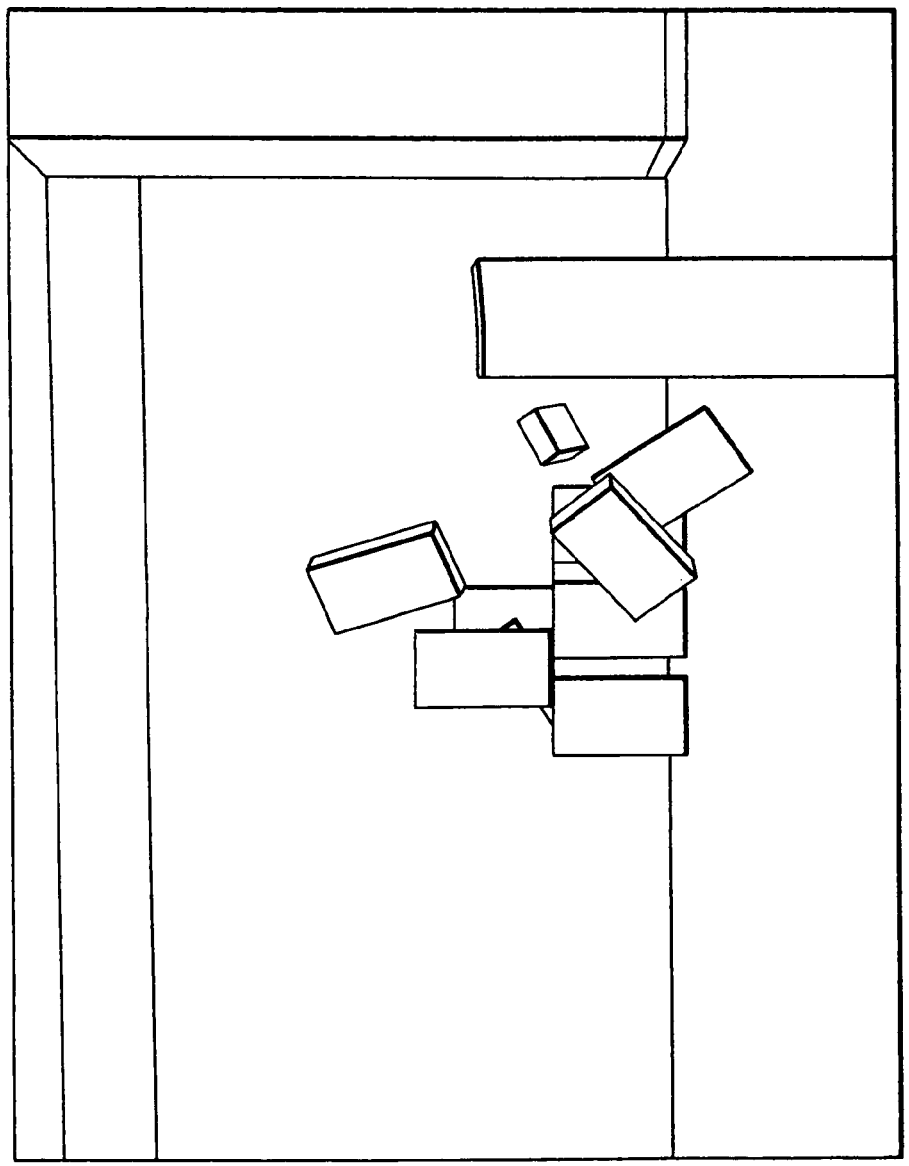
FIG. 23 illustrates a further game scene in the present invention.
Figure 24:
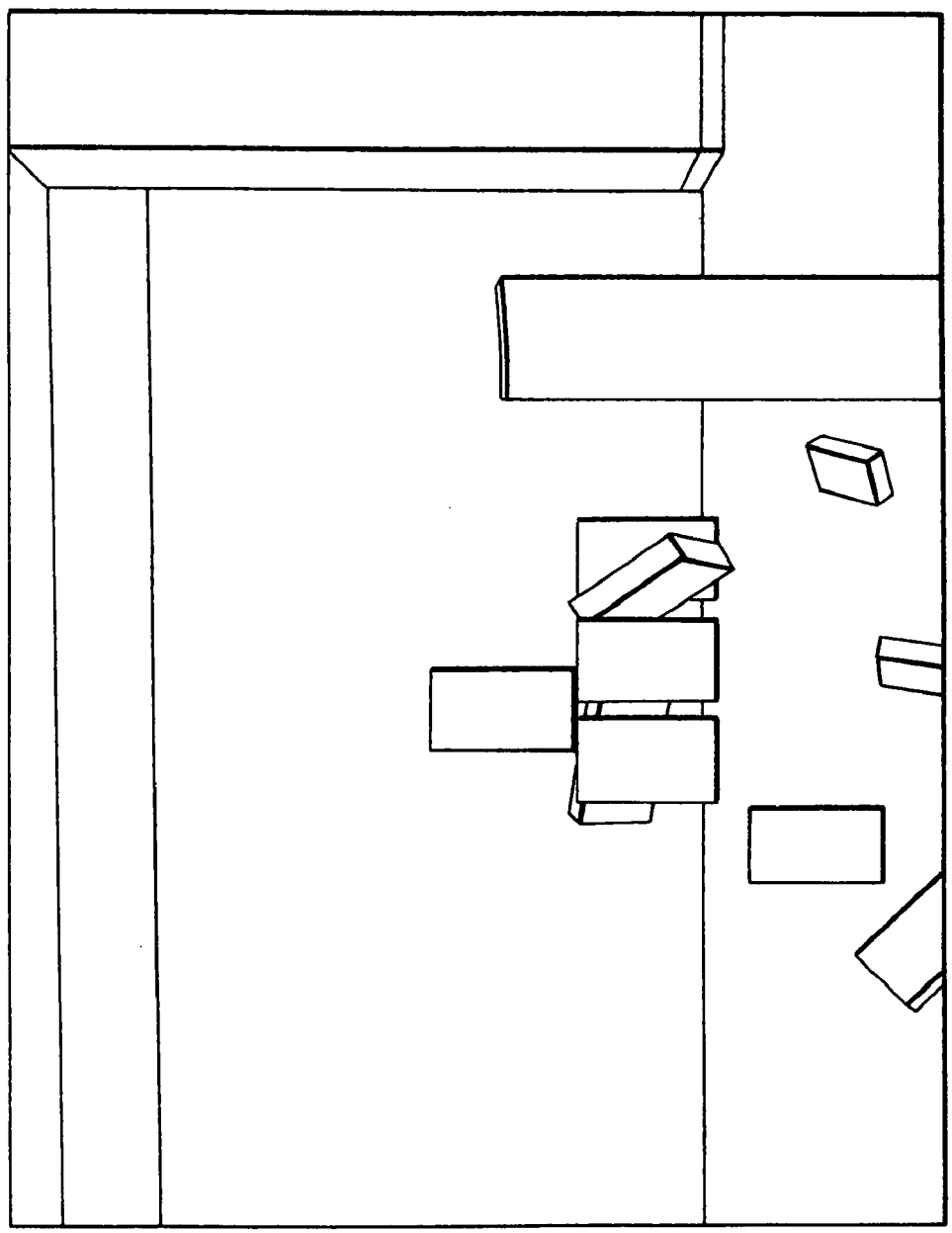
FIG. 24 illustrates a further game scene in the present invention.
Figure 25:
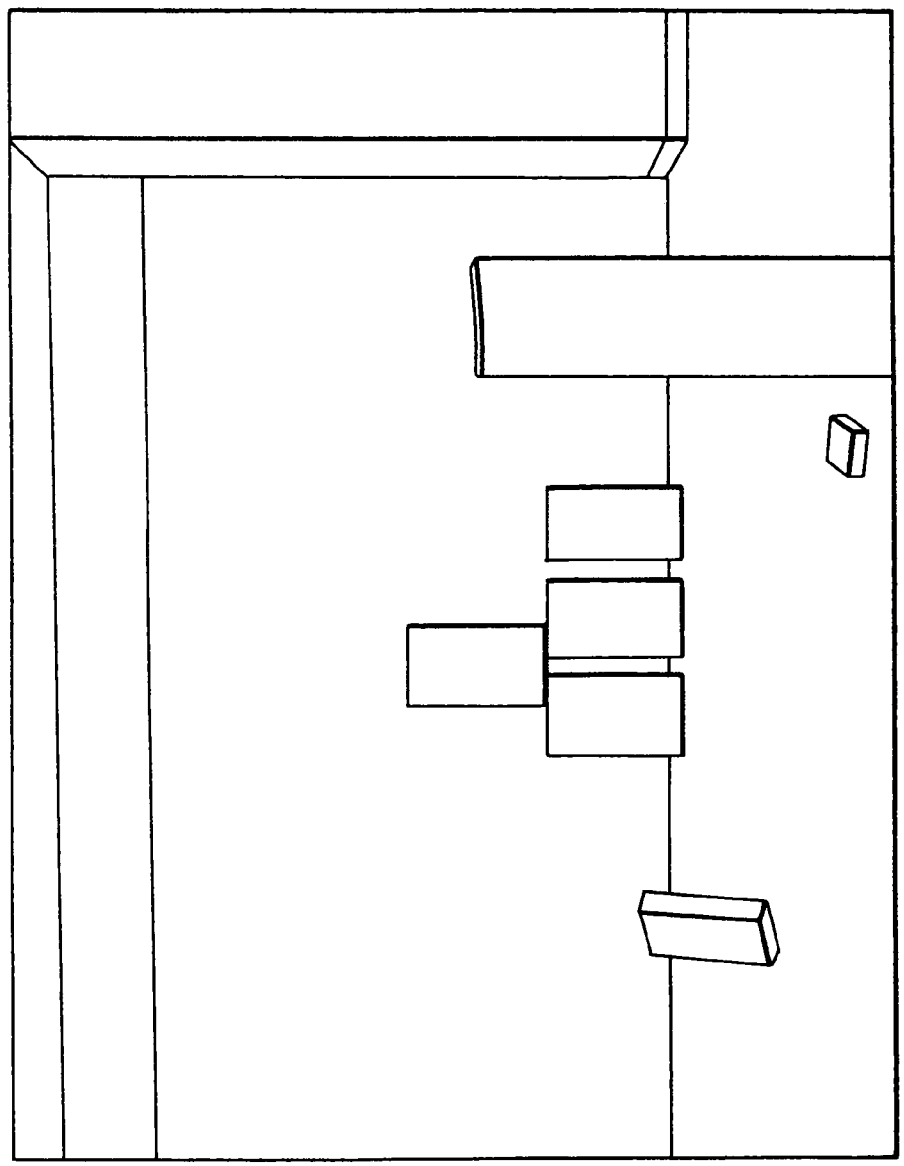
FIG. 25 illustrates a further game scene in the present invention.

FIGS. 23 to 25 shows a further picture representing that the tumbled video cases are falling. In such a manner, a condition in which each of the video cases begins to be tumbled depending on the bullet hit position and the tumbled state propagates to the other video cases is really represented.

In order to implement the collapse of the stacked video cases as described above, each of the elemental objects representing the video cases has its own state information, and an image is generated based on this state information.

Figure 26:
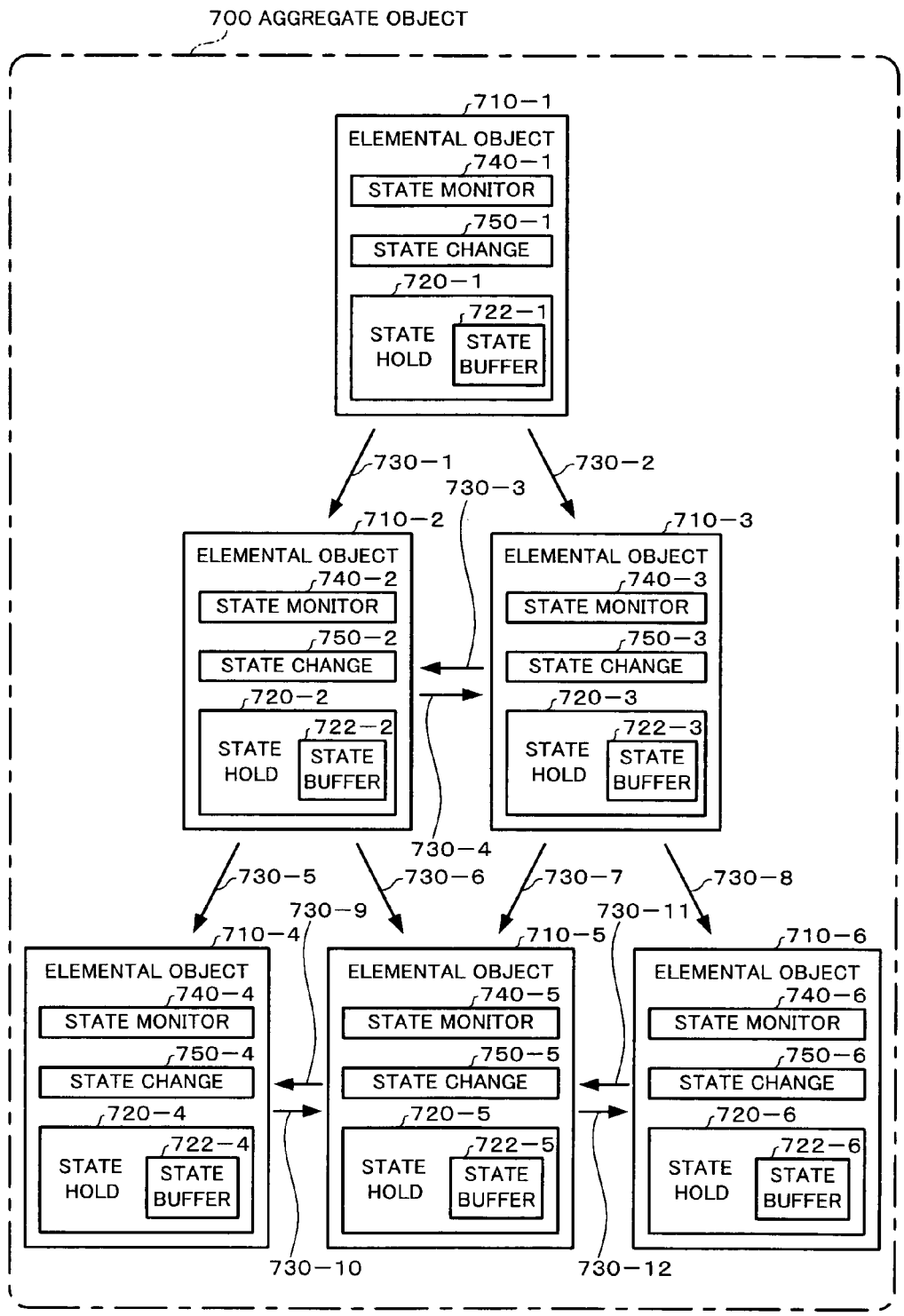
FIG. 26 diagrammatically illustrates the positional relationship between an aggregate object (or a stack of video cases) and elemental objects (or video cases) and the manner of monitoring and changing their states.

FIG. 26 diagrammatically illustrates the positional relationship between the aggregate object (or stack of video cases) and the elemental objects (or video cases) and the monitoring and changing of state.

Reference numeral 700 represents the aggregate object while reference numerals 710-1 to 710-5 represent the elemental objects forming the aggregate object. Herein, the stack of video cases 210 shown in FIG. 19 is the aggregate object while each of the video cases 212–242 is one elemental object. FIG. 26 only illustrates five elemental objects.

As in FIG. 14, each of the elemental objects 710-1 to 710-5 has a state hold means 7210-1 to 720-5 for holding its own state, the present state of the elemental object being held in the corresponding one of state buffers 722-1 to 722-5.

Each of the elemental objects 710-1 to 710-5 also has a state monitor means 740-1 to 740-5 for monitoring the states of the other elemental objects belonging to the same aggregate object, and a state change means for 750-1 to 750-5 for changing its own state based on the states of the other elemental objects belonging to the same aggregate object and having a predetermined relationship relative to that elemental object.

The state buffer of each of the elemental objects (or video cases) holds either of three states, "initial", "tumbling" and "end-of-tumbling". The "initial" state means that a video case is placed in the stack at a predetermined position. The "tumbling" state means one before a video case fallen from its predetermined position reaches the floor as shown by 218 in FIG. 20. Unlike the glass pieces, the shape of each elemental object or video case will not be changed, but its location will be changed. The "end-of-tumbling" state means one after the fallen video case has reached the floor.

Reference numerals 730-1 to 730-12 represent the direction of elemental objects to be monitored. With the stack of video cases, the states of the elemental objects located downward and laterally relating to one video case will be monitored.

Each of the elemental objects includes a surrounding object list stored all the other elemental objects to be monitored, each of which has a predetermined relationship relative to the change of state in that elemental object. For example, the surrounding object list for an elemental object 710-1 may have stored elemental objects 710-2 and 710-3. The surrounding object list for an elemental object 710-2 may have stored elemental objects 710-3, 710-4 and 710-5.

The state monitor means 740-1 to 740-12 for each elemental object monitors the states of the other elemental objects stored in its own surrounding object list. Based on the monitored states of the elemental objects, the state of each of the elemental objects is changed. If the state of any elemental object located around one elemental object is changed from the initial state to the tumbling state, a predetermined time delay is used before the state of the one elemental object is changed from the initial state to the tumbling state.

In such a manner, it becomes possible to generate an image that when the stack of video cases is impacted at any video case, its tumbling state propagates to the other video cases surrounding that video case, the stack being collapsed.

3. Hardware configuration

Figure 27:
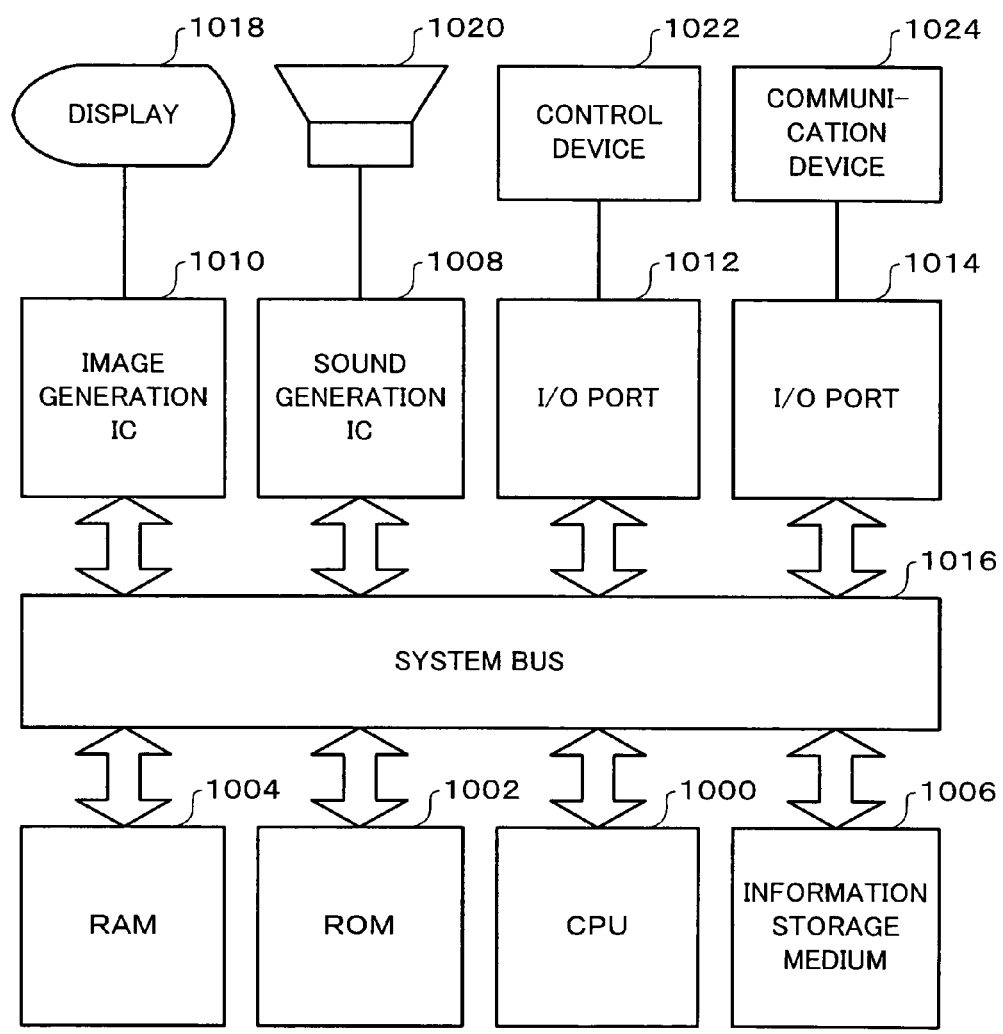
FIG. 27 illustrates an arrangement of hardware for implementing one embodiment of the present invention.

One hardware configuration capable of implementing this embodiment will now be described with reference to FIG. 27. The system shown in FIG. 27 comprises CPU 1000, ROM 1002, RAM 1004, an information storage medium 1006, a sound generation IC 1008, an image generation IC 1010 and I/O ports 1012, 1014, all of which are interconnected through a system bus 1016 for data reception and transmission. The image generation IC 1010 is connected to a display 1018; the sound generation IC 1008 to a speaker 1020; the I/O port 1012 to a control device 1022; and the I/O port 1014 to a communication device 1024.

The information storage medium 1006 has mainly stored a program, image data for representing objects, sound data and others. For example, a home game apparatus may use DVD, game cassette, CD-ROM or the like as an information storage medium for storing the game program and other data. An arcade game apparatus may use a memory such as ROM or the like. In the latter case, the information storage medium 1006 is in the form of ROM 1002.

The control device 1022 corresponds to a game controller, control panel or the like. The control device 1022 is used by the player for inputting his or her judgment into the game system according to the progress of game.

CPU 1000 is to perform the control of the entire game system and the processing of various data according to the program stored in the information storage medium 1006, the system program (such as information for initializing the entire system) stored in the ROM 1002, input signals from the control device 1022 and so on. RAM 1004 is a memory means used as a working area for the CPU 1000 and has stored given contents in the information storage medium 1006 and ROM 1002 or the results of computation in the CPU 1000. The structures of data having a logical structure for implementing this embodiment may be build on this RAM or information storage medium.

The sound and image generation IC's 1008, 1010 in this game system are to output game sounds and images in a preferred manner. The sound generation IC 1008 is in the form of an integrated circuit for generating game sounds such as sound effects, background music and others, based on the information stored in the information storage medium 1006 and ROM 1002, the generated sounds being then outputted through the speaker 1020. The image generation IC 1010 is in the form of an integrated circuit which can generate pixel information to be outputted toward the display 1018 based on the image information from the RAM 1004, ROM 1002, information storage medium 1006 and so on. The display 1018 may be in the form of a so-called head mount display (HMD).

The communication device 1024 is to receive and transmit various pieces of information which are utilized in the game apparatus from and to external. The communication device 1024 is connected to the other game system (or systems) to transmit and receive given information corresponding to the game program from and to the other game systems or utilized to transmit and receive the information including the game program and other data through the communication line.

Various processing steps previously described in connection with FIGS. 1 to 26 are implemented by the information storage medium 1006 stored the information such as program, data and so on, and CPU 1000, image generation IC 1010 and sound generation IC 1008 which operate based on the information from the information storage medium 1006. The processings in the image generation IC 1010 and sound generation IC 1008 may be performed in a software manner through the CPU 1000 or all-purpose DSP.

When this embodiment is applied to such an arcade game system as shown in FIG. 1, a system board (or circuit board) 1106 included in the game system comprises CPU, image generation IC, sound generation IC and others all of which are mounted therein. The system board 1106 includes an information storage medium or semiconductor memory 1108 which has stored information for executing (or implementing) the processings of this embodiment (or means of the present invention). These pieces of information will be referred to "the stored information pieces".

Figure 28A:
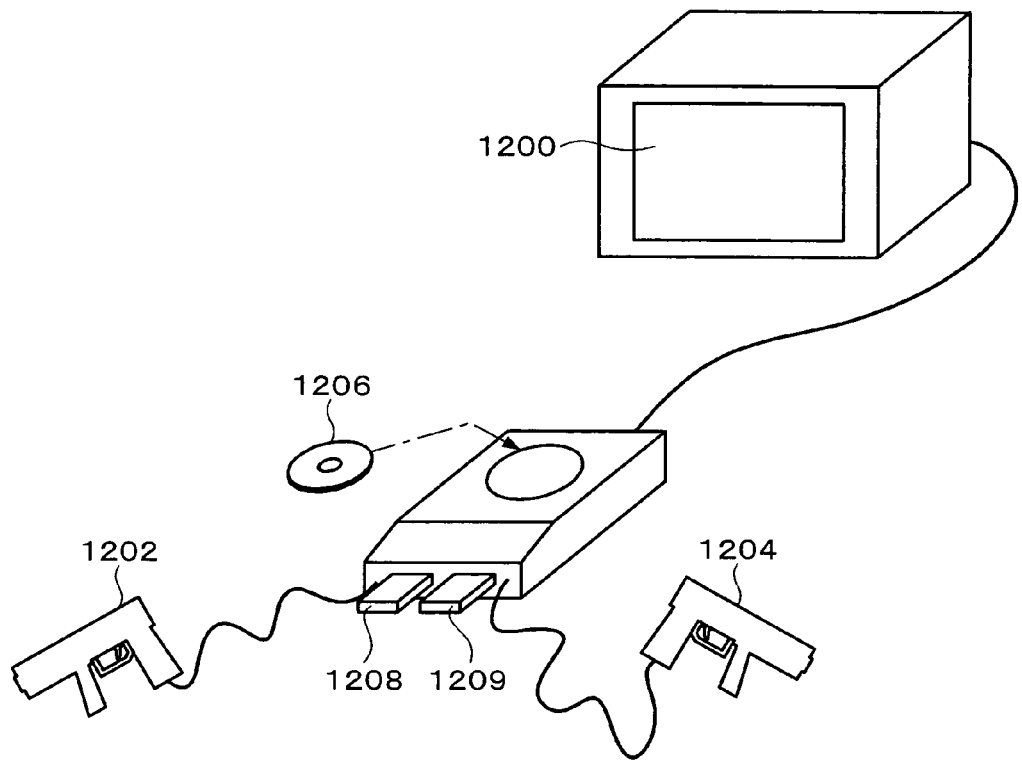
FIGS. 28A and 28B illustrate different forms of the game system to which the present invention can be applied.

FIG. 28A shows a home game apparatus to which this embodiment is applied. A player enjoys a game by manipulating game controllers 1202 and 1204 while viewing a game picture displayed on a display 1200. In such a case, the aforementioned stored information pieces have been stored in DVD 1206 and memory cards 1208, 1209 which are detachable information storage media in the game system body.

Figure 28B:
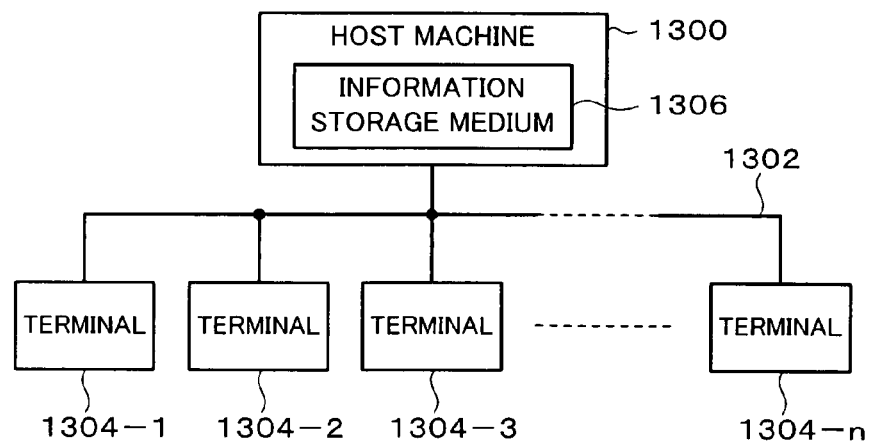

FIG. 28B shows an example wherein this embodiment is applied to a game system which includes a host machine 1300 and terminals 1304-1 to 1304-n connected to the host machine 1300 through a communication line (which is a small-scale network such as LAN or a global network such as INTERNET) 1302. In such a case, the above stored information pieces have been stored in an information storage medium 1306 such as magnetic disk device, magnetic tape device, semiconductor memory or the like which can be controlled by the host machine 1300, for example. If the terminals 1304-1 to 1304-n are designed each to have a CPU, image generation IC and sound processing IC and to generate game images and game sounds in a stand-alone manner, the host machine 1300 delivers game program and other data for generating game images and game sounds to the terminals 1304-1 to 1304-n. On the other hand, if the game images and sounds cannot be generated by the terminals in the stand-alone manner, the host machine 1300 will generate the game images and sounds which are in turn transmitted to the terminals 1304-1 to 1304-n.

In FIG. 28B, the processings of the present invention may be decentralized into the host machine (or server) and terminals. The above information pieces for implementing the present invention may be distributed and stored into the information storage media of the host machine (or server) and terminals.

Each of the terminals connected to the communication line may be either of home or arcade type. When the arcade game systems are connected to the communication line, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above forms, but may be carried out in any of various other forms.

The present invention is not limited to the glass plate or stacked video cases in which the impact propagates. For example, any change may propagate independently of the impact. The change may relate to the shape, color, position or direction of each elemental object. The change may further relate to the control of movement for a group of fishes, birds or other animals.

Although the present invention has been described as to the aggregate object consisting of stacked video cases and the elemental objects each of which is a video case, it is not limited to such objects. For example, the present invention may be applied to an aggregate object consisting of a group of fishes, birds or other animals and elemental objects each of which is one of the grouped fishes, birds or other animals.

Although the present invention has been described as to the change of state occurring when a bullet hits the aggregate object with impact, it is not limited to such a change of state. The change of state may occur on the occurrence of a given event. For example, the given event may include the passage of a given time or the satisfaction of a given game condition.

Other than the gun-type game, the present invention may similarly be applied to any of various other games such as other shooting games, fighting games, robot combat games, sports games, competitive games, role-playing games, music playing games, dancing games and so on.

Furthermore, the present invention can be applied to various image generating systems such as arcade game systems, home game systems, large-scaled multi-player attraction systems, simulators, multimedia terminals, image generating systems, game image generating system boards and so on.

What is claimed is:

1. An image generating system which generates an image of an aggregate object formed by a plurality of elemental objects, the system comprising:

means which changes a state of an elemental object among the plurality of elemental objects in accordance with occurrence of an event;

state change propagation means which propagates the state change to another elemental object which belongs to the same aggregate object as the changed elemental object, wherein at least one elemental object has the state change propagation means; and image generation means which generates an image in accordance with a state of an elemental object, wherein after the event has occurred, the state change propagation means determines at random whether a state of an elemental object is changed when a state of another elemental object, which has a predetermined relationship with the elemental object and belongs to the same aggregate object as the elemental object, has changed.

2. The image generating system as defined in claim 1, wherein in the image generation, at least one of shape, color, position, rotation angle, direction, moving direction and moving speed is changed in accordance with the state change of an elemental object.

3. The image generation system as defined in claim 1, wherein a plurality of state change patterns are provided for the elemental objects, and an image of the changed elemental object is generated in accordance with a state change pattern selected from the plurality of state change patterns.

4. The image generation system as defined in claim 1, wherein the aggregate object is formed by assembling the elemental objects having different shapes without any gaps.

5. The image generation system as defined in claim 1, wherein an image of the aggregate object is generated as an image of a single object before the occurrence of an event, and the image is generated as an image of the aggregate object formed by a plurality of elemental objects after the occurrence of the event.

6. An image generating system which generates an image of an aggregate object formed by a plurality of elemental objects, the system comprising:
   means which changes a state of an elemental object among the plurality of elemental objects in accordance with occurrence of an event;
   state change propagation means which propagates the state change to another elemental object which belongs to the same aggregate object as the changed elemental object, wherein the state change propagation means comprises:
      state hold means which holds a state of an elemental object,
      state monitor means which monitors a state of another elemental object belonging to the same aggregate object as the state-held elemental object, and
      state change means which changes a state of an elemental object when a state of another elemental object which has a predetermined relationship with the elemental object has changed; and
   image generation means which generates an image in accordance with a state of an elemental object,
   wherein after the event has occurred, the state change propagation means determines at random whether a state of an elemental object is changed when a state of another elemental object, which has a predetermined relationship with the elemental object and belongs to the same aggregate object as the elemental object, has changed.

7. The image generating system as defined in claim 6, wherein the state change means of the state change propagation means changes a state of an elemental object when a state of another elemental object which has a predetermined positional relationship with the elemental object has changed.

8. The image generation system as defined in claim 6, wherein the state change means of the state change propagation means changes the state of the elemental object after a given time has elapsed from the state change of another elemental object.

9. The image generation system as defined in claim 6, wherein the state change means of the state change propagation means changes a first state of an elemental object into a second state after a given time has elapsed.

10. A computer-readable program embodied on an information storage medium or in a carrier wave, storing information for operating an image generation system which generates an image of an aggregate object formed by a plurality of elemental objects, the program comprising information for implementing:
    means which changes a state of an elemental object among the plurality of elemental objects in accordance with occurrence of an event;
    state change propagation means which propagates the state change to another elemental object which belongs to the same aggregate object as the changed elemental object, wherein at least one elemental object has the state change propagation means; and
    image generation means which generates an image in accordance with a state of an elemental object,
    wherein after the event has occurred, the state change propagation means determines at random whether a state of an elemental object is changed when a state of another elemental object, which has a predetermined relationship with the elemental object and belongs to the same aggregate object as the elemental object, has changed.

11. The program embodied on an information storage medium or in a carrier wave as defined in claim 10, further comprising:
    information for implementing the image generation by changing at least one of shape, color, position, rotation angle, direction, moving direction and moving speed in accordance with the state change of an elemental object.

12. The program embodied on an information storage medium or in a carrier wave as defined in claim 10, further comprising information for providing the state change propagation means for each elemental object.

13. The program embodied on an information storage medium or in a carrier wave as defined in claim 10, further comprising information for:
    providing a plurality of state change patterns for the elemental objects; and
    generating an image of the changed elemental object in accordance with a state change pattern selected from the plurality of state change patterns.

14. The program embodied on an information storage medium or in a carrier wave as defined in claim 10, further comprising information for forming the aggregate object by assembling the elemental objects having different shapes without any gaps.

15. The program embodied on an information storage medium or in a carrier wave as defined in claim 10, further comprising information for:
    generating an image of the aggregate object as an image of a single object before the occurrence of an event; and
    generating the image as an image of the aggregate object formed by a plurality of elemental objects after the occurrence of the event.

16. A computer-readable program embodied on an information storage medium or in a carrier wave, storing information for operating an image generation system which generates an image of an aggregate object formed by a plurality of elemental objects, the program comprising information for implementing:

means which changes a state of an elemental object among the plurality of elemental objects in accordance with occurrence of an event;

state change propagation means which propagates the state change to another elemental object which belongs to the same aggregate object as the changed elemental object;

image generation means which generates an image in accordance with a state of an elemental object; and information for implementing in the state change propagation means including:
  state hold means which holds a state of an elemental object,
  state monitor means which monitors a state of another elemental object belonging to the same aggregate object as the state-held elemental object, and
  state change means which changes a state of an elemental object when a state of another elemental object which has a predetermined relationship with the elemental object has changed,
wherein after the event has occurred, the state change propagation means determines at random whether a state of an elemental object is changed when a state of another elemental object, which has a predetermined relationship with the elemental object and belongs to the same aggregate object as the elemental object, has changed.

17. The program embodied on an information storage medium or in a carrier wave as defined in claim 16,
wherein the state change means of the state change propagation means changes a state of an elemental object when a state of another elemental object which has a predetermined positional relationship with the elemental object has changed.

18. The program embodied on an information storage medium or in a carrier wave as defined in claim 16,
wherein the state change means of the state change propagation means changes the state of the elemental object after a given time has elapsed from the state change of another elemental object.

19. The program embodied on an information storage medium or in a carrier wave as defined in claim 16,
wherein the state change means of the state change propagation means changes a first state of an elemental object into a second state after a given time has elapsed.

20. An image generating system which generates an image of an aggregate object formed by a plurality of elemental objects, the system comprising:
  means which changes a state of an elemental object among the plurality of elemental objects in accordance with occurrence of an event;
  state change propagation means which propagates the state change to another elemental object which belongs to the same aggregate object as the changed elemental object; and
  image generation means which generates an image in accordance with a state of an elemental object, wherein the state change propagation means comprises:
  state hold means which holds a state of an elemental object;
  state monitor means which monitors a state of another elemental object belonging to the same aggregate object as the state-held elemental object; and
  state change means which changes a state of an elemental object when a state of another elemental object which has a predetermined relationship with the elemental object has changed,
  wherein the state change means for the state change propagation means changes the state of the elemental object after a given time has elapsed from the state change of another elemental object.

* * * * *